(12) United States Patent
Nakamura et al.

(10) Patent No.: US 9,707,849 B2
(45) Date of Patent: Jul. 18, 2017

(54) CHARGING AND DISCHARGING CONTROL APPARATUS AND ELECTRIC MOTOR VEHICLE

(71) Applicant: Mitsubishi Electric Corporation, Tokyo (JP)

(72) Inventors: Kenta Nakamura, Tokyo (JP); Toshihide Satake, Tokyo (JP); Takanori Matsunaga, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/781,371

(22) PCT Filed: Jun. 7, 2013

(86) PCT No.: PCT/JP2013/065813
§ 371 (c)(1),
(2) Date: Sep. 30, 2015

(87) PCT Pub. No.: WO2014/196075
PCT Pub. Date: Dec. 11, 2014

(65) Prior Publication Data
US 2016/0039296 A1 Feb. 11, 2016

(51) Int. Cl.
*B60L 9/00* (2006.01)
*B60L 11/18* (2006.01)
(Continued)

(52) U.S. Cl.
CPC ....... *B60L 11/1809* (2013.01); *B60L 11/1816* (2013.01); *B60L 11/1825* (2013.01);
(Continued)

(58) Field of Classification Search
CPC combination set(s) only.
See application file for complete search history.

(56) References Cited

U.S. PATENT DOCUMENTS 8,336,651 B2 12/2012 Nishi et al.
8,600,593 B2 12/2013 Ohno
(Continued)

FOREIGN PATENT DOCUMENTS

CN 101443978 A 5/2009
CN 101496255 A 7/2009
(Continued)

OTHER PUBLICATIONS

International Search Report of PCT/JP2013/065813 dated Aug. 13, 2013.
(Continued)

*Primary Examiner* — Hussein A. Elchanti
(74) *Attorney, Agent, or Firm* — Sughrue Mion, PLLC; Richard C. Turner

(57) ABSTRACT

The present invention aims to provide a charging and discharging control apparatus that can reduce a period until charging and discharging processing is started while reducing power consumption during non-use, and to provide an electric motor vehicle including the charging and discharging control apparatus. The charging and discharging control apparatus of the present invention predicts, with use of a charging and discharging start predictor, whether a charging and discharging operation including at least one of an operation to charge a storage apparatus and an operation to discharge the storage apparatus is started or not. In accordance with a result of prediction, a manager manages transition of a charging and discharging controller from an activated state to a standby state and from the standby state to the activated state.

10 Claims, 10 Drawing Sheets

(51) Int. Cl.
*H01M 10/44* (2006.01)
*H02J 7/00* (2006.01)

(52) U.S. Cl.
CPC ....... *B60L 11/1838* (2013.01); *B60L 11/1861* (2013.01); *H01M 10/44* (2013.01); *H02J 7/0027* (2013.01); *B60L 2240/622* (2013.01); *Y02T 10/7005* (2013.01); *Y02T 10/7055* (2013.01); *Y02T 10/7072* (2013.01); *Y02T 10/7291* (2013.01); *Y02T 10/92* (2013.01); *Y02T 90/121* (2013.01); *Y02T 90/128* (2013.01); *Y02T 90/14* (2013.01); *Y02T 90/16* (2013.01); *Y02T 90/162* (2013.01); *Y02T 90/163* (2013.01)

(56) References Cited

U.S. PATENT DOCUMENTS

| | | | |
|---|---|---|---|
| 8,820,445 | B2 | 9/2014 | Kikuchi |
| 2008/0185991 | A1* | 8/2008 | Harris ................. B60L 11/1818 320/109 |
| 2009/0266631 | A1 | 10/2009 | Kikuchi |
| 2010/0000809 | A1 | 1/2010 | Nishi et al. |
| 2010/0320964 | A1* | 12/2010 | Lathrop ................. B60K 6/445 320/109 |
| 2011/0022256 | A1* | 1/2011 | Asada ................. B60L 11/1824 701/22 |
| 2011/0156644 | A1* | 6/2011 | Arai ..................... B60L 3/0046 320/109 |
| 2011/0215758 | A1* | 9/2011 | Stahlin .................. G07C 5/008 320/109 |
| 2011/0266996 | A1* | 11/2011 | Sugano .................. B60L 3/003 320/104 |
| 2012/0074903 | A1 | 3/2012 | Nakashima |
| 2013/0311037 | A1* | 11/2013 | Ukai ...................... G06F 17/00 701/36 |
| 2014/0012444 | A1* | 1/2014 | Wake .................. B60L 11/881 701/22 |

FOREIGN PATENT DOCUMENTS

| | | |
|---|---|---|
| CN | 101730965 A | 6/2010 |
| JP | 07-123599 A | 5/1995 |
| JP | 3565004 B2 | 9/2004 |
| JP | 2006-069350 A | 3/2006 |
| JP | 2009-017675 A | 1/2009 |
| JP | 2010-110068 A | 5/2010 |
| WO | 2010/143482 A1 | 12/2010 |

OTHER PUBLICATIONS

International Preliminary Report on Patentability dated Dec. 17, 2015 issued in corresponding application No. PCT/JP2013/065813.
Communication dated Mar. 22, 2016, from the Japanese Patent Office in counterpart application No. 2015-521249.
Communication dated Sep. 19, 2016, from the State Intellectual Property Office of the P.R.C. in counterpart application No. 201380077250.9.

* cited by examiner

F I G . 7
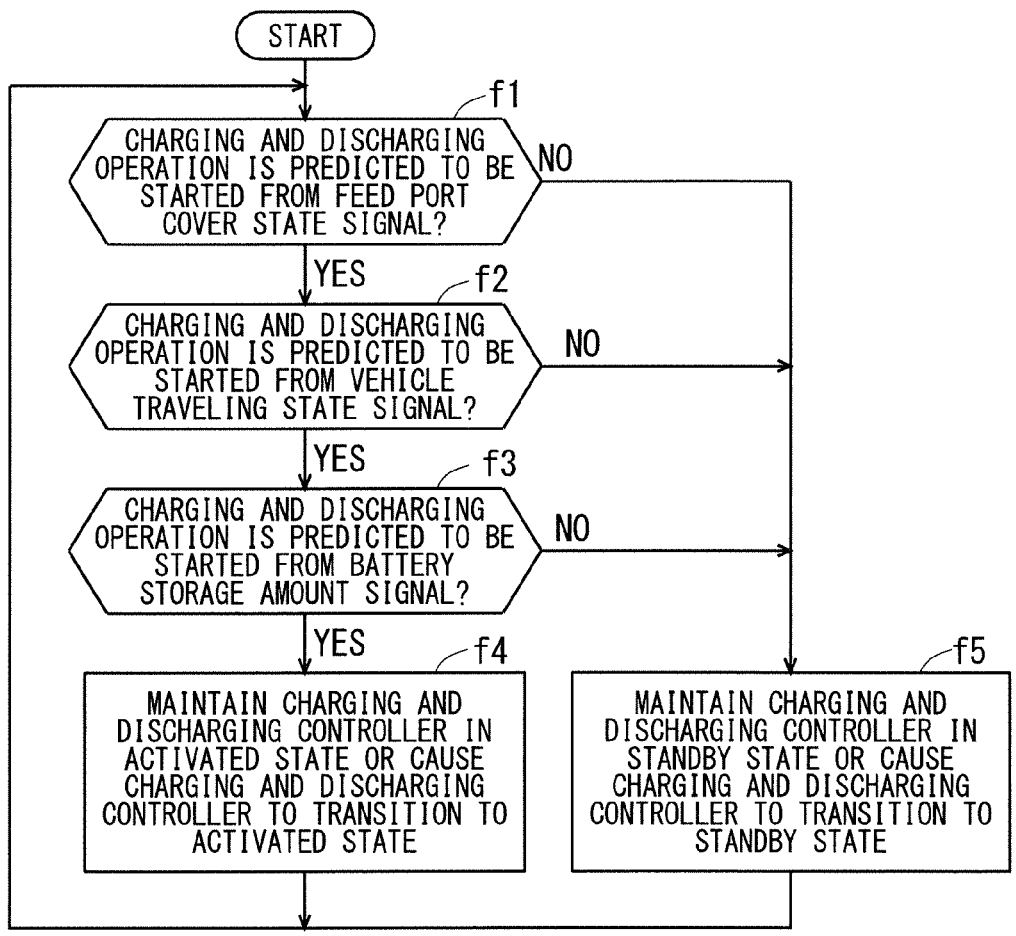

F I G . 1 2
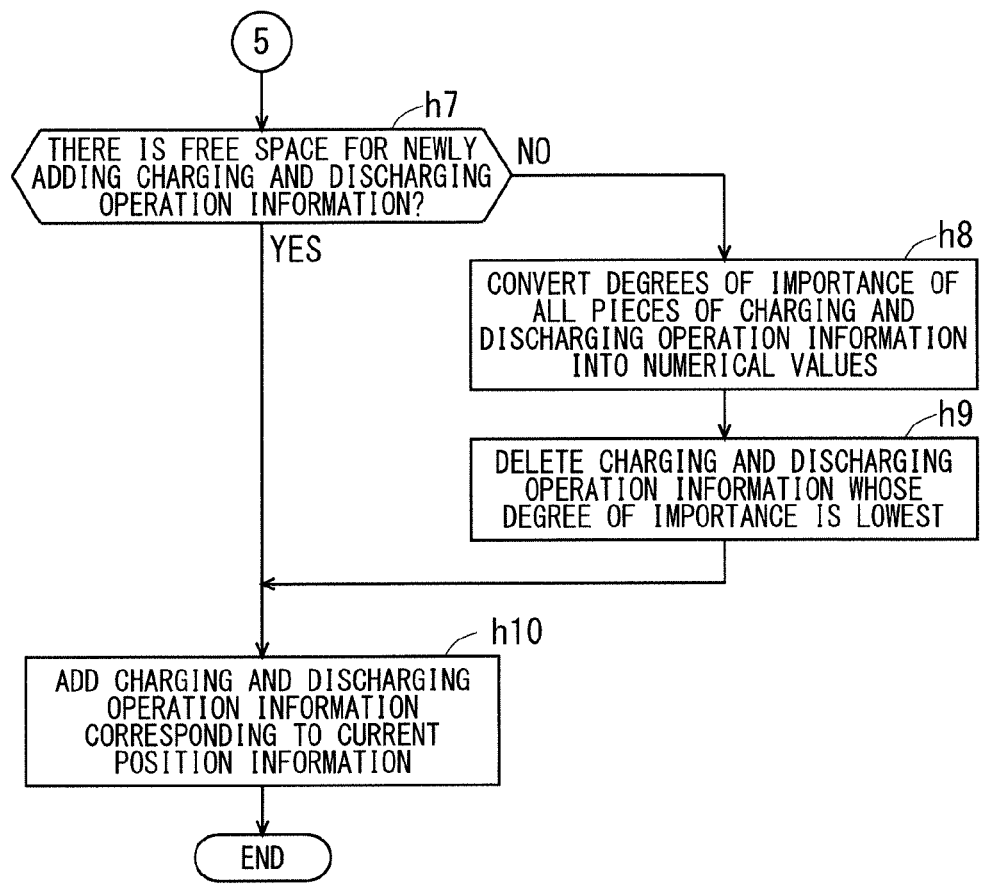

CHARGING AND DISCHARGING CONTROL APPARATUS AND ELECTRIC MOTOR VEHICLE

CROSS REFERENCE TO RELATED APPLICATIONS

This is a National Stage of International Application No. PCT/JP2013/065813 filed Jun. 7, 2013, the contents of which are incorporated herein by reference in its entirety.

TECHNICAL FIELD

The present invention relates to a charging and discharging control apparatus installed in an electric motor vehicle that travels using power stored in a storage apparatus as a power source, and also relates to the electric motor vehicle in which the charging and discharging control apparatus is installed.

BACKGROUND ART

An electric motor vehicle includes a storage apparatus, such as a battery, a capacitor, and a flywheel, to electrically, chemically, or mechanically store electric energy. The electric motor vehicle travels using power stored in the storage apparatus as a power source. Examples of the electric motor vehicle are an electric vehicle that travels using a motor as a drive source, and a hybrid vehicle that travels using both a motor and an engine as a drive source. Prior to use of the electric motor vehicle or after use of the electric motor vehicle for a certain period, it becomes necessary to perform a feeding operation to supply power from a charging and discharging installation (hereinafter, also referred to as an "external charging and discharging installation") external to the electric motor vehicle to the storage apparatus to charge the storage apparatus.

The storage apparatus included in the electric motor vehicle is used not only as a power source of the electric motor vehicle but also as a power source for household use for the purpose of coping with power shortages in the event of a disaster, and efficiently using natural energy such as photovoltaic power generation. For example, the storage apparatus of the electric motor vehicle is used as a storage apparatus for storing a surplus of power generated at home. Power stored in the storage apparatus of the electric motor vehicle is supplied, for example, to a home through the external charging and discharging installation.

The electric motor vehicle has a connector for physically or electromagnetically connecting the electric motor vehicle to the external charging and discharging installation to store power supplied from the external charging and discharging installation in the storage apparatus or to supply power stored in the storage apparatus to the external charging and discharging installation. A user of the electric motor vehicle is required to perform a charging and discharging operation of connecting the electric motor vehicle to the external charging and discharging installation through the connector and performing charging and discharging.

A charging and discharging control apparatus is installed in the electric motor vehicle to provide communication with the external charging and discharging installation and to perform charging and discharging processing on the storage apparatus. The charging and discharging control apparatus determines, in consideration of various conditions, a current value at which charging and discharging are performed, time at which charging and discharging are started, and time at which charging and discharging are ended to charge or discharge the storage apparatus of the electric motor vehicle. Various conditions include the state of the storage apparatus such as storage capacity and temperature of the storage apparatus, rated capacity of the storage apparatus, rated capacity of the external charging and discharging installation, an electric rate and available electric power that vary over time, and estimated time at which a user uses the electric motor vehicle next, for example.

In order to improve electric cost during traveling of the electric motor vehicle and to prevent, for example, a flat battery caused by consuming power stored in the battery when the electric motor vehicle is not used, the charging and discharging control apparatus is preferably in a standby state in which power consumption is low when the charging and discharging operation is not performed. On the other hand, when the user starts the charging and discharging operation, the charging and discharging control apparatus is expected to be in an activated state in which the charging and discharging processing is possible or to transition to the activated state in a short period of time.

A control apparatus performing electronic control is required to undergo various procedures to be in the activated state after a power supply is turned on. For example, boot processing of reading an operating system (OS) into a central processing unit (CPU), processing of initializing various types of hardware and memory performed by the OS, fault diagnosis processing, processing of reading and activating a control application program from a non-volatile recording medium, and the like are required to be performed. Some apparatuses thus take it a long time to be activated.

An on-vehicle navigation apparatus is a typical example of an on-vehicle apparatus that takes a long time to be activated. Technology for improving users' convenience while suppressing power consumption during a standby state is studied (see Patent Documents 1 and 2, for example).

An on-vehicle electronic apparatus disclosed in Patent Document 1, for example, a navigation apparatus, regularly activates a transmitter/receiver, transmits an ID request to a mobile apparatus external to a vehicle, and waits for a reply from the mobile apparatus. When a signal is returned from the mobile apparatus, the navigation apparatus is activated before a user gets into the vehicle. When there is no reply from the mobile apparatus, a power supply of the transmitter/receiver is turned off, so that power consumption during the standby state can be suppressed compared to a case where the power supply of the transmitter/receiver is always ON.

An on-vehicle apparatus disclosed in Patent Document 2, for example, a navigation apparatus, is maintained in an operating state for a certain period after a user finishes using the on-vehicle apparatus and turns off an accessory switch. As a result, the user can activate the on-vehicle apparatus in a short time without performing activation processing by turning on the accessory switch in the period during which the on-vehicle apparatus is maintained in the operating state after the accessory switch is turned off.

PRIOR ART DOCUMENTS

Patent Documents

Patent Document 1: Japanese Patent No. 3565004
Patent Document 2: Japanese Patent Application Laid-Open Publication No. 2006-69350

SUMMARY OF INVENTION

Problems to be Solved by the Invention

From among on-vehicle apparatuses, a charging and discharging control apparatus is required to support a plurality of charging and discharging standards, internet communication using various protocols, various types of encryption, authentication, and settlement processing to achieve efficient charging and discharging in consideration of an electric rate that varies over time. This makes communication between the charging and discharging control apparatus in the vehicle and a communication apparatus external to the vehicle complicated.

In addition, complicated data processing is required to make a plan for charging and discharging and to control charging and discharging, increasing the number of parts installed in the charging and discharging control apparatus, and capacity of volatile memory with increasing scale of a program. A time required for fault diagnosis at the time of activation, cyclic redundancy check (CRC) of non-volatile memory, initialization of various types of hardware and non-volatile memory, and activation of a control program tends to increase dramatically.

If it takes a long time to activate the charging and discharging control apparatus from the standby state to the activated state, latency occurs between the start of the charging and discharging operation performed by the user and the actual start of the charging and discharging processing. This greatly reduces users' convenience.

For example, when the charging and discharging control apparatus is caused to transition from the standby state to the activated state upon detection of user's insertion of a charging gun into a feed port of the vehicle, the user cannot leave the vehicle until the start of charging and discharging is confirmed. When the user leaves the vehicle without confirming the start of charging and discharging, the user might notice that charging control has not been started successfully after leaving the vehicle, and consequently expected charging and discharging cannot be performed.

When the start of communication between the charging and discharging control apparatus and the external charging and discharging installation is delayed, latency might occur before the user is allowed to perform an operation to provide an instruction to start charging and discharging to the external charging and discharging installation. Alternatively, the external charging and discharging installation that has started charging and discharging control early might fail to establish communication due to a timeout error.

Technology disclosed in Patent Documents 1 and 2 mentioned above relates to a navigation apparatus. Technology disclosed in Patent Documents 1 or 2 is not applicable to the charging and discharging control apparatus as it stands.

For example, when technology disclosed in Patent Document 1 is applied, the charging and discharging control apparatus is activated when there is a reply from the mobile apparatus external to the vehicle, but the reply from the mobile apparatus does not necessarily mean that the charging and discharging operation is performed. The charging and discharging control apparatus can be activated when the charging and discharging operation is not performed, and power consumption of the charging and discharging control apparatus cannot sufficiently be reduced.

Technology disclosed in Patent Document 2 is applicable only after the use of the on-vehicle apparatus. Application of technology disclosed in Patent Document 2 cannot reduce a period until the charging and discharging control apparatus starts the charging and discharging processing when the charging and discharging operation is performed prior to the use of the electric motor vehicle.

It is an object of the present invention to provide a charging and discharging control apparatus that can reduce the period until the charging and discharging processing is started while reducing power consumption during non-use, and to provide an electric motor vehicle including the charging and discharging control apparatus.

Means for Solving the Problems

A charging and discharging control apparatus of the present invention is a charging and discharging control apparatus that controls at least one of charging and discharging of a storage apparatus installed in an electric motor vehicle, the charging and discharging control apparatus including: a charging and discharging start predictor that predicts whether a charging and discharging operation is started or not, the charging and discharging operation including at least one of an operation to charge the storage apparatus and an operation to discharge the storage apparatus; a charging and discharging controller that performs charging and discharging processing including at least one of charging and discharging of the storage apparatus; and a manager that manages an operating state of the charging and discharging controller, wherein the operating state of the charging and discharging controller is capable of transitioning between an activated state in which the charging and discharging processing is possible and a standby state in which power consumption is lower than in the activated state, and the manager manages the operating state of the charging and discharging controller in accordance with a result of prediction performed by the charging and discharging start predictor.

An electric motor vehicle of the present invention is an electric motor vehicle including: a storage apparatus that is chargeable and dischargeable; and a charging and discharging control apparatus that is the above-mentioned charging and discharging control apparatus of the present invention, and controls at least one of charging and discharging of the storage apparatus.

Effects of the Invention

According to the charging and discharging control apparatus of the present invention, the charging and discharging start predictor predicts whether the charging and discharging operation on the storage apparatus installed in the electric motor vehicle is started or not. In accordance with the result of prediction, the manager manages the operating state of the charging and discharging controller. As a result, the charging and discharging controller can be in the activated state in which the charging and discharging processing on the storage apparatus is possible before a user starts the charging and discharging operation. The charging and discharging controller can start the charging and discharging processing immediately after the user starts the charging and discharging operation.

By the charging and discharging start predictor regularly predicting whether the charging and discharging operation is started or not, the state of the charging and discharging controller can be switched in accordance with the status of performing the charging and discharging operation. For example, the charging and discharging controller can be maintained in the standby state in which power consumption is lower than in the activated state during a period in which the charging and discharging operation is not predicted to be started. The charging and discharging controller can be caused to transition from the activated state to the standby state in a case where the charging and discharging operation is not performed when a certain period has elapsed since prediction of the start of the charging and discharging operation. The charging and discharging controller can thereby effectively be in the standby state, leading to improvement in electric cost of the electric motor vehicle. Consumption of power stored in the storage apparatus can be suppressed when the electric motor vehicle is not used. As described above, a period until the charging and discharging processing is started can be reduced while power consumption during non-use is reduced.

According to the electric motor vehicle of the present invention, the above-mentioned charging and discharging control apparatus of the present invention controls charging and discharging of the storage apparatus. As such, the period until the charging and discharging processing on the storage apparatus is started can be reduced while power consumption when the electric motor vehicle is not used is reduced.

Objects, features, aspects and advantages of the present invention will become more apparent from the following detailed description and the accompanying drawings.

BRIEF DESCRIPTION OF DRAWINGS

FIG. 7 is a flow chart showing the procedure for processing performed by a charging and discharging start predictor 15 relating to charging and discharging control performed by the charging and discharging control apparatus 1 in the first embodiment of the present invention.

FIG. 12 is a flow chart showing the operation to update the charging and discharging operation information stored in the position information and charging and discharging history storage 51 in the second embodiment of the present invention

DESCRIPTION OF EMBODIMENTS

First Embodiment

Figure 1:
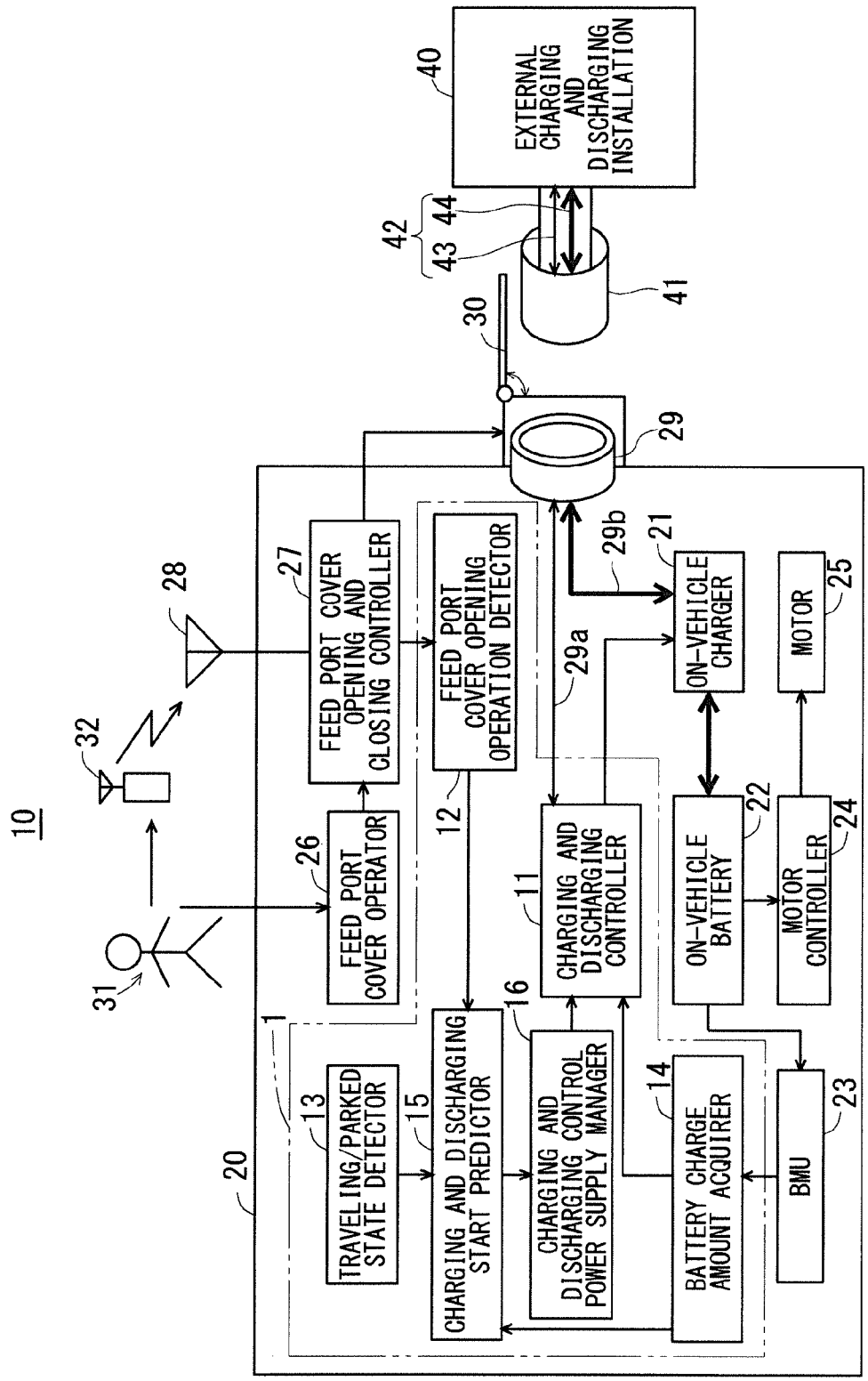
FIG. 1 is a block diagram showing configuration of a charging and discharging system 10 including a charging and discharging control apparatus 1 in the first embodiment of the present invention.

FIG. 1 is a block diagram showing configuration of a charging and discharging system 10 including a charging and discharging control apparatus 1 in the first embodiment of the present invention. The charging and discharging system 10 includes an external charging and discharging installation 40 and an electric motor vehicle 20 that includes the charging and discharging control apparatus 1. The external charging and discharging installation 40 is located external to the electric motor vehicle 20.

The electric motor vehicle 20 includes the charging and discharging control apparatus 1, an on-vehicle charger 21, an on-vehicle battery 22, a battery management unit (BMU) 23, a motor controller 24, a motor 25, a feed port cover operator 26, a feed port cover opening and closing controller 27, an antenna 28, a feed port 29, and a feed port cover 30. The charging and discharging control apparatus 1 includes a charging and discharging controller 11, a feed port cover opening operation detector 12, a traveling/parked state detector 13, a battery charge amount acquirer 14, a charging and discharging start predictor 15, and a charging and discharging control power supply manager 16.

The on-vehicle battery 22 corresponds to a storage apparatus. The charging and discharging control power supply manager 16 corresponds to a manager. The feed port cover opening operation detector 12 corresponds to an opening operation detector. The battery charge amount acquirer 14 corresponds to a storage amount acquirer.

The electric motor vehicle 20 is an electric vehicle (EV) or a plug-in hybrid electric vehicle (PHEV), for example. When the electric motor vehicle 20 is the EV, the electric motor vehicle 20 travels using the motor 25 as a drive source. When the electric motor vehicle 20 is the PHEV, the electric motor vehicle 20 travels using both the motor 25 and an engine, which is not shown, as a drive source.

The on-vehicle battery 22 is used as a power source for supplying power to the motor 25, for example. The on-vehicle battery 22 may be used as a power source of an apparatus, such as an air conditioner, internal to the vehicle, and may be used as a power source of an apparatus external to the vehicle. The on-vehicle battery 22 is chargeable and dischargeable by the external charging and discharging installation 40 located external to the electric motor vehicle 20. The on-vehicle battery 22 is implemented by a lithium ion secondary battery, for example.

The on-vehicle charger 21 supplies power supplied from the external charging and discharging installation 40 to the on-vehicle battery 22 or supplies power stored in the on-vehicle battery 22 to the external charging and discharging installation 40 in accordance with an instruction provided by the charging and discharging controller 11 of the charging and discharging control apparatus 1. The on-vehicle battery 22 is chargeable and dischargeable with DC power in the present embodiment.

For example, when DC power is transferred between the electric motor vehicle 20 and the external charging and discharging installation 40, the on-vehicle charger 21 supplies DC power supplied from the external charging and discharging installation 40 to the on-vehicle battery 22 as it stands to charge the on-vehicle battery 22. The on-vehicle charger 21 supplies DC power stored in the on-vehicle battery 22 to the external charging and discharging installation 40 as it stands to discharge the on-vehicle battery 22.

When AC power is transferred between the electric motor vehicle 20 and the external charging and discharging installation 40, the on-vehicle charger 21 converts AC power supplied from the external charging and discharging installation 40 into power that can charge the on-vehicle battery 22, i.e., DC power, and supplies DC power to the on-vehicle battery 22 to charge the on-vehicle battery 22. The on-vehicle charger 21 converts DC power stored in the on-vehicle battery 22 into power that can be supplied to the external charging and discharging installation 40, i.e., AC power, and supplies AC power to the external charging and discharging installation 40 to discharge the on-vehicle battery 22.

The electric motor vehicle 20 can travel using power stored in the on-vehicle battery 22 as a power source. Specifically, the electric motor vehicle 20 travels by supplying power stored in the on-vehicle battery 22 to the motor 25 and thereby driving the motor 25.

The BMU 23 is connected to the on-vehicle battery 22, and manages the state of the on-vehicle battery 22. Specifically, the BMU 23 acquires battery information that is information relating to the on-vehicle battery 22 from the on-vehicle battery 22, and manages the state of the on-vehicle battery 22 based on the acquired battery information.

The battery information includes charge amount information that is information relating to the amount of charged power (hereinafter, also referred to as a "charge amount") of the on-vehicle battery 22. In the present embodiment, the charge amount information indicates a value of the amount of charged power of the on-vehicle battery 22. The BMU 23 detects the charge amount of the on-vehicle battery 22, and generates the charge amount information indicating a value of the detected charge amount.

The motor controller 24 controls the amount of power supplied from the on-vehicle battery 22 to the motor 25 to control operation of the motor 25. The motor 25 is driven by power supplied from the on-vehicle battery 22, and serves as a drive source for traveling of the electric motor vehicle 20.

The feed port cover operator 26 is an operating lever, for example. The feed port cover operator 26 is operated by a user 31 when the feed port cover 30 is opened. When the user 31 operates the feed port cover operator 26, the feed port cover operator 26 generates an opening instruction signal indicating an instruction to open the feed port cover 30, and provides the opening instruction signal to the feed port cover opening and closing controller 27.

The antenna 28 is connected to the feed port cover opening and closing controller 27. The electric motor vehicle 20 can wirelessly communicate with a wireless communication apparatus 32 external to the electric motor vehicle 20 through the antenna 28. The wireless communication apparatus 32 may be a remote control for keyless entry, a mobile phone, a smartphone, or a tablet terminal apparatus, for example.

The user may transmits the opening instruction signal indicating the instruction to open the feed port cover 30 to the electric motor vehicle 20 with use of the wireless communication apparatus 32 instead of operating the feed port cover operator 26. When receiving the opening instruction signal, the antenna 28 provides the received opening instruction signal to the feed port cover opening and closing controller 27.

When provided with the opening instruction signal from the feed port cover operator 26 or the antenna 28, the feed port cover opening and closing controller 27 provides the provided opening instruction signal to the feed port cover opening operation detector 12. The feed port cover opening and closing controller 27 also performs opening control to open the feed port cover 30 based on the opening instruction signal. The user 31 can cause the feed port cover opening and closing controller 27 to perform opening control by operating the feed port cover operator 26 or by transmitting the opening instruction signal to the electric motor vehicle 20 with use of the wireless communication apparatus 32.

The feed port 29 is a connector for connecting a charging gun 41 of the external charging and discharging installation 40 when charging or discharging of the on-vehicle battery 22 is performed. The feed port 29 is also referred to as an inlet connector. The feed port 29 corresponds to a connector, and electrically connects the electric motor vehicle 20 and the external charging and discharging installation 40. In the present embodiment, the electric motor vehicle 20 and the external charging and discharging installation 40 are electrically connected to each other by physically coming into contact with each other through the feed port 2, which is the connector. The electric motor vehicle 20 and the external charging and discharging installation 40 may not be connected in this manner, and may be electrically connected to each other by electromagnetically connected to each other without contact.

The feed port 29 is provided with the feed port cover 30 that covers the feed port 29. In the present embodiment, an inner cover that covers the feed port 29 is provided inside the feed port cover 30, although it is not shown. The feed port 29 is covered with the inner cover, and is further covered with the feed port cover 30. The feed port cover 30 and the inner cover are opened to open the feed port 29. The inner cover may not be provided. When the inner cover is not provided, the feed port 29 is opened by opening the feed port cover 30.

The feed port 29 is connected to the charging and discharging controller 11 through a communication line 29a. As a result, information can be transmitted/received between the electric motor vehicle 20 and the external charging and discharging installation 40 through communication lines 29a and 43 when the electric motor vehicle 20 and the external charging and discharging installation 40 are connected to each other. The communication lines 29a and 43 are shown by thin double-headed arrows in FIG. 1.

The feed port 29 is also connected to the on-vehicle charger 21 through a power line 29b. As a result, power can be transferred between the electric motor vehicle 20 and the external charging and discharging installation 40 through power lines 29b and 44 when the electric motor vehicle 20 and the external charging and discharging installation 40 are connected to each other. The power lines 29b and 44 are shown by thick double-headed arrows in FIG. 1.

The charging and discharging controller 11 includes a central processing unit (CPU) and a writable memory, such as random access memory (RAM), for example. The memory stores a control program relating to charging and discharging processing on the on-vehicle battery 22. The charging and discharging controller 11 controls operation of the on-vehicle charger 21 in accordance with the control program stored in the memory.

The charging and discharging controller 11 controls the operation of the on-vehicle charger 21 to control an operation to supply power from the on-vehicle battery 22 to the external charging and discharging installation 40 and an operation to supply power from the external charging and discharging installation 40 to the on-vehicle battery 22. This means that the charging and discharging controller 11 controls charging and discharging of the on-vehicle battery 22 through the on-vehicle charger 21. The charging and discharging controller 11 controls at least one of charging and discharging of the on-vehicle battery 22.

The feed port cover opening operation detector 12 detects an opening operation to provide an instruction to open a cover of the feed port 29. When the feed port 29 is provided with a plurality of covers, the feed port cover opening operation detector 12 detects an opening operation to provide an instruction to open the outermost cover. In the present embodiment, the feed port cover opening operation detector 12 detects an opening operation to provide an instruction to open the feed port cover 30.

When provided with the opening instruction signal from the feed port cover opening and closing controller 27, the feed port cover opening operation detector 12 detects that an operation to open the feed port cover 30 of the electric motor vehicle 20 has been performed. When detecting that the operation to open the feed port cover 30 of the electric motor vehicle 20 has been performed, the feed port cover opening operation detector 12 provides a feed port cover state signal indicating the state of the feed port cover 30 to the charging and discharging start predictor 15.

The operation to open the feed port cover 30 is performed before the user 31 of the electric motor vehicle 20 starts the charging and discharging operation. An opening operation detection signal provided by the feed port cover opening operation detector 12 to the charging and discharging start predictor 15 is one of judgment criteria used when whether the charging and discharging operation is started or not is predicted.

The traveling/parked state detector 13 detects the state of the electric motor vehicle 20, specifically, whether the electric motor vehicle 20 is traveling or is parked. The traveling/parked state detector 13 provides, as the result of detection, the charging and discharging start predictor 15 with a vehicle traveling state signal indicating whether the electric motor vehicle 20 is traveling or not. The vehicle traveling state signal provided by the traveling/parked state detector 13 to the charging and discharging start predictor 15 is one of the judgment criteria used when whether the charging and discharging operation is started or not is predicted.

The battery charge amount acquirer 14 acquires, from the BMU 23, the charge amount information, which indicates the charge amount of the on-vehicle battery 22. The battery charge amount acquirer 14 generates a battery storage amount signal indicating a storage amount of the on-vehicle battery 22 based on the charge amount information acquired from the BMU 23, and provides the battery storage amount signal to the charging and discharging start predictor 15.

The charging and discharging start predictor 15 predicts whether the charging and discharging operation is started by the user 31 or not, and provides the result of prediction to the charging and discharging control power supply manager 16. The charging and discharging start predictor 15 predicts whether the charging and discharging operation is started or not at least based on the opening operation detection signal provided by the feed port cover opening operation detector 12. In the present embodiment, the charging and discharging start predictor 15 predicts whether the charging and discharging operation is started or not based on the opening operation detection signal provided by the feed port cover opening operation detector 12, the vehicle traveling state signal provided by the traveling/parked state detector 13, and the battery storage amount signal provided by the battery charge amount acquirer 14.

The charging and discharging control power supply manager 16 manages an operating state of the charging and discharging controller 11. The operating state of the charging and discharging controller 11 can transition between an activated state and a standby state. The "activated state" herein refers to a state in which the charging and discharging controller 11 can perform the charging and discharging processing. The "standby state" refers to a state of being in lower power consumption than the activated state, i.e., a state in which power consumption is lower than power consumption in the activated state. The state in which power consumption is lower than power consumption in the activated state includes a state in which a power supply of the charging and discharging controller 11 is OFF, i.e., a state in which power supply to the charging and discharging controller 11 is stopped. In the standby state, the charging and discharging controller 11 does not operate, i.e., does not perform the charging and discharging processing.

The charging and discharging control power supply manager 16 manages the power supply, which is not shown, supplying power to the charging and discharging controller 11 and controls power supplied from the power supply to the charging and discharging controller 11 to cause the charging and discharging controller 11 to transition from the activated state to the standby state or to transition from the standby state to the activated state.

Specifically, the charging and discharging control power supply manager 16 causes the charging and discharging controller 11 to transition from the activated state to the standby state or to transition from the standby state to the activated state in accordance with the result of prediction provided by the charging and discharging start predictor 15.

The charging and discharging control power supply manager 16 controls the charging and discharging controller 11 so that the charging and discharging controller 11 is in the activated state or in the standby state to control the charging and discharging operation on the on-vehicle battery 22 performed by the on-vehicle charger 21. When the charging and discharging controller 11 is in the activated state, the on-vehicle charger 21 is also in the activated state, i.e., the state in which the charging and discharging operation is possible. When the charging and discharging controller 11 is in the standby state, the on-vehicle charger 21 is also in the standby state.

The external charging and discharging installation 40 is located at a place where the electric motor vehicle 20 can be parked, for example, at home of an owner of the electric motor vehicle 20 and gas stations. The external charging and discharging installation 40 includes the charging gun 41 and a feed cable 42. The feed cable 42 includes the communication line 43 and the power line 44. The external charging and discharging installation 40 is connected to the electric motor vehicle 20 through the charging gun 41 and the feed cable 42.

Control relating to charging and discharging of the electric motor vehicle 20 is performed by exchanging instructions and information between the external charging and discharging installation 40 and the charging and discharging control apparatus 1. Instructions and information are exchanged through the communication line 43. Power relating to charging and discharging of the electric motor vehicle 20 is transferred between the external charging and discharging installation 40 and the on-vehicle battery 22 through the power line 44.

The external charging and discharging installation 40 is connected to a power supply, which is not shown, through the power line 44 of the feed cable 42, and receives supply of power from the power supply. The power supply may be a DC power supply, and may be an AC power supply. The power supply may be a commercial power supply, and may be a power generation apparatus, such as a solar panel, installed at home, for example. The external charging and discharging installation 40 can output power to the outside, i.e., can be discharged. The external charging and discharging installation 40 outputs power to a power system, which is not shown, or home electronic appliances, such as an air conditioner, installed at home, for example.

The external charging and discharging installation 40 supplies power supplied from the power supply to the on-vehicle battery 22 of the electric motor vehicle 20 to charge the on-vehicle battery 22. When the power supply supplying power to the external charging and discharging installation 40 (hereinafter, also referred to as the "power supply of the external charging and discharging installation 40") is the DC power supply, the external charging and discharging installation 40 controls the amount of DC power supplied to the on-vehicle battery 22 with use of an installation-side controller, which is not shown, to control the charge amount of the on-vehicle battery 22.

When the power supply of the external charging and discharging installation 40 is the AC power supply, the charge amount of the on-vehicle battery 22 is controlled by the on-vehicle charger 21 installed in the electric motor vehicle 20. The on-vehicle charger 21 generates DC power from AC power supplied from the external charging and discharging installation 40, and supplies DC power to the on-vehicle battery 22. The on-vehicle charger 21 controls the amount of DC power supplied to the on-vehicle battery 22 to control the charge amount of the on-vehicle battery 22.

The charging gun 41 is a connector for connecting the electric motor vehicle 20 and the external charging and discharging installation 40. The charging gun 41 is also referred to as an infra connector. The charging gun 41 is connected to the installation-side controller, which is not shown, through the feed cable 42, specifically, through the communication line 43 and the power line 44. The communication line 43 is shown by the thin double-headed arrow, and the power line 44 is shown by the thick double-headed arrow in FIG. 1.

The charging gun 41 is connected to the feed port 29 of the electric motor vehicle 20 through the feed cable 42. As a result, the electric motor vehicle 20 and the external charging and discharging installation 40 are connected to each other. The installation-side controller supplies power supplied from the power supply to the on-vehicle battery 22 through the charging gun 41, the feed cable 42, the feed port 29, and the on-vehicle charger 21.

Figure 2:
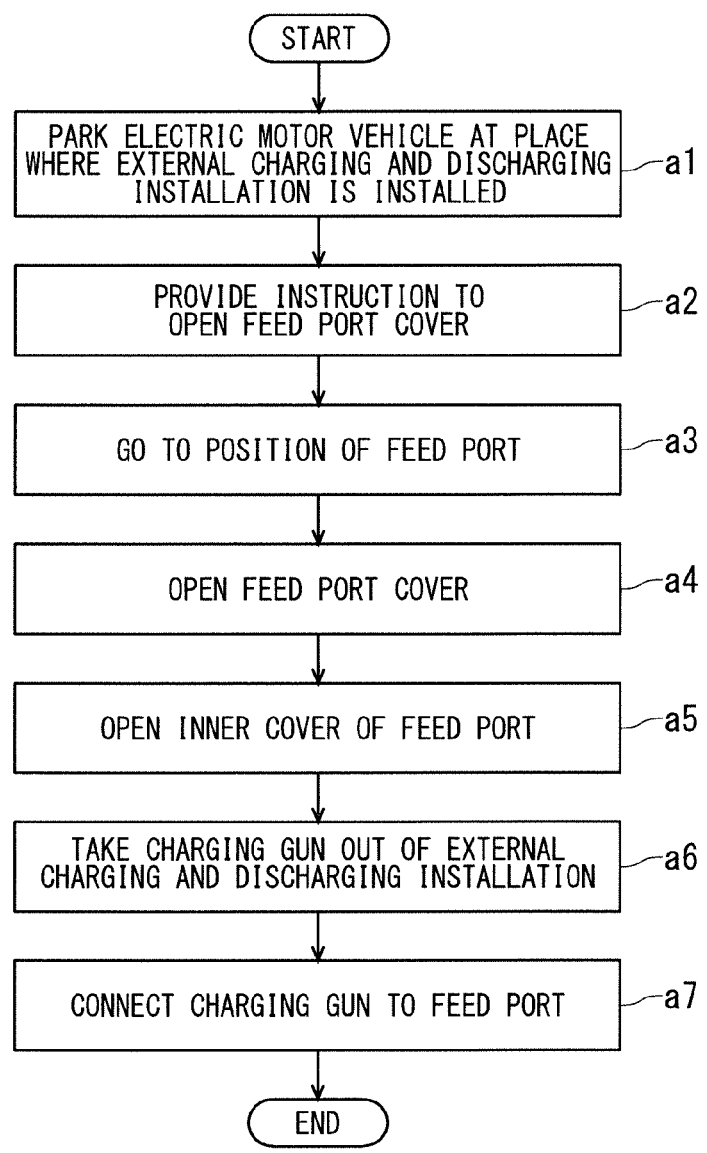
FIG. 2 is a flow chart showing the procedure for a charging and discharging operation performed by a user on an electric motor vehicle 20 in the first embodiment of the present invention.

FIG. 2 is a flow chart showing the procedure for the charging and discharging operation performed by a user on the electric motor vehicle 20 in the first embodiment of the present invention. In the following description, the "charging and discharging operation" refers to the procedure relating to transfer of power from the external charging and discharging installation 40, and indicates an act of connecting the charging gun 41 to the feed port 29 of the electric motor vehicle 20 or parking the electric motor vehicle at a non-contact feed spot while aligning the position of a power receiving apparatus of the electric motor vehicle.

In step a1, the user 31 parks the electric motor vehicle 20 at a place where the external charging and discharging installation 40 is installed. In step a2, the user 31 provides an instruction to open the feed port cover 30. Specifically, the user 31 operates the feed port cover operator 26 to provide the instruction to open the feed port cover 30. The user 31 may operate the wireless communication apparatus 32 to provide the instruction to open the feed port cover 30. The feed port cover 30 is unlocked and opened by the instruction to open the feed port cover 30.

In step a3, the user 31 gets out of the electric motor vehicle 20, and goes to the position of the feed port 29. The feed port 29 is provided in a rear part of the side of the electric motor vehicle 20, for example. The position of the feed port 29 is not limited to this position.

In step a4, the user 31 opens the feed port cover 30 by hand, for example. The user 31 opens the feed port cover 30 to its fullest extent.

In step a5, the user 31 opens the inner cover of the feed port 29. The feed port 29 is thereby opened. In step a6, the user 31 takes the charging gun 41 out of the external charging and discharging installation 40. In step a7, the user 31 connects the charging gun 41 to the feed port 29.

Figure 3:
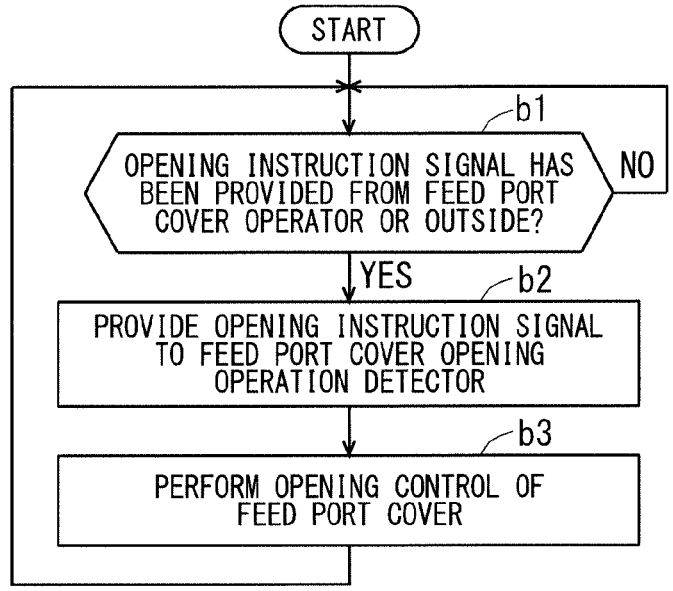
FIG. 3 is a flow chart showing the procedure for processing relating to control to open a feed port cover 30 performed by a feed port cover opening and closing controller 27.

FIG. 3 is a flow chart showing the procedure for processing relating to control to open the feed port cover 30 performed by the feed port cover opening and closing controller 27. Each step of the flow chart shown in FIG. 3 is performed by the feed port cover opening and closing controller 27. The flow chart shown in FIG. 3 is started when the power supply of the feed port cover opening and closing controller 27 is turned on, and processing transitions to step b1. The power supply of the feed port cover opening and closing controller 27 is turned on when power is supplied to the feed port cover opening and closing controller 27, for example. The power supply of the feed port cover opening and closing controller 27 may not be turned on in this manner, and may be turned on through mechanical control performed with a lever or a spring.

In step b1, the feed port cover opening and closing controller 27 judges whether or not the opening instruction signal has been provided from the feed port cover operator 26 or the external wireless communication apparatus 30. When it is judged that the opening instruction signal has been provided in step b1, processing transitions to step b2. When it is judged that the opening instruction signal has not been provided, provision of the opening instruction signal is waited. This means that processing in and after step b2 is triggered by the instruction to open the feed port cover 30 provided in step a2 of the flow chart shown in FIG. 2.

In step b2, the feed port cover opening and closing controller 27 provides the opening instruction signal to the feed port cover opening operation detector 12.

In step b3, the feed port cover opening and closing controller 27 performs opening control of the feed port cover 30 of performing control to open the feed port cover 30. Specifically, the feed port cover opening and closing controller 27 unlocks the feed port cover 30 to open the feed port cover 30. Processing returns to step b1 when processing in step b3 ends.

Figure 4:
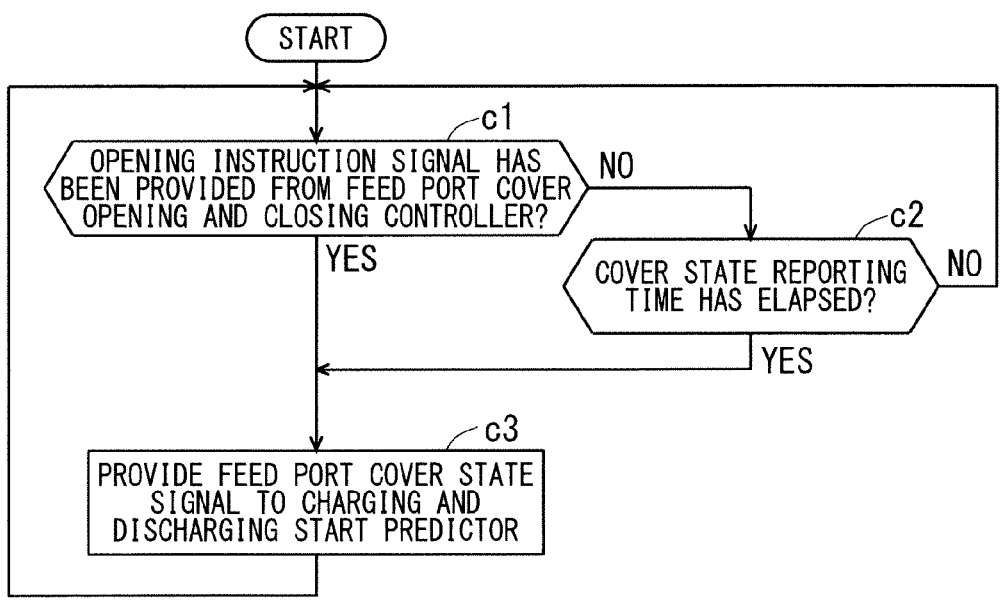
FIG. 4 is a flow chart showing the procedure for processing relating to charging and discharging control performed by a feed port cover opening operation detector 12.
Figure 5:
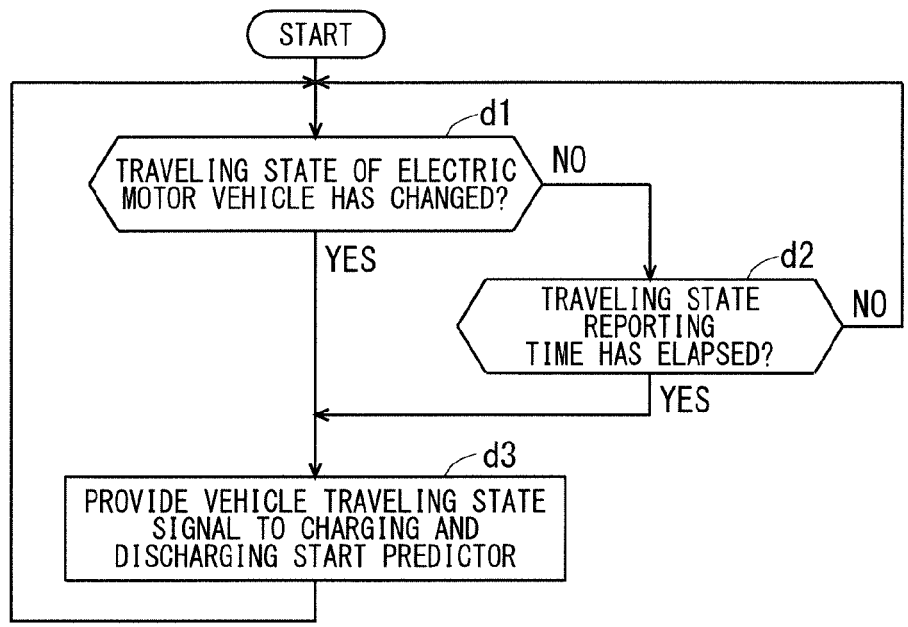
FIG. 5 is a flow chart showing the procedure for processing relating to charging and discharging control performed by a traveling/parked state detector 13.
Figure 6:
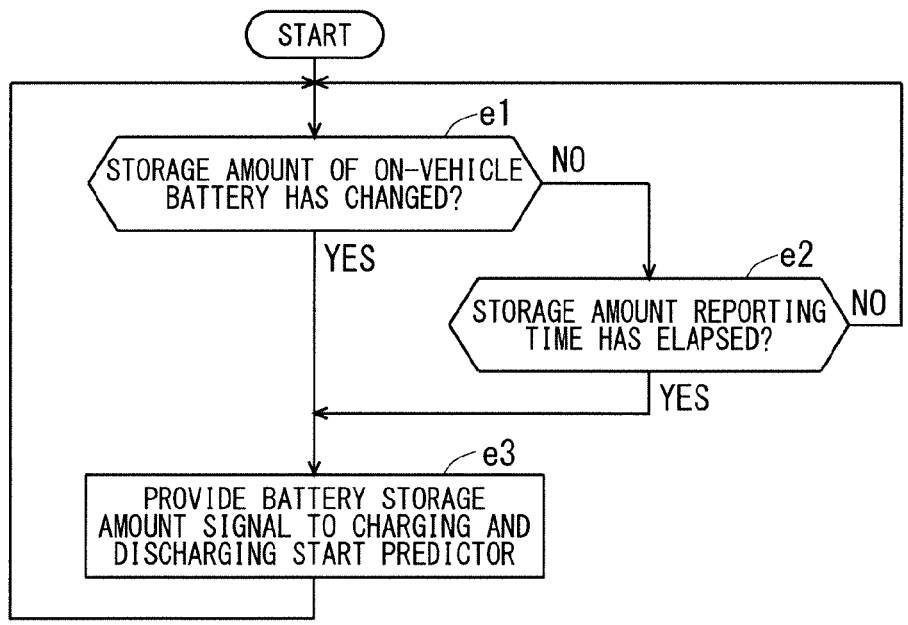
FIG. 6 is a flow chart showing the procedure for processing relating to charging and discharging control performed by a battery charge amount acquirer 14.

FIGS. 4 to 6 are flow charts showing the procedure for processing relating to charging and discharging control performed by the charging and discharging control apparatus 1 in the first embodiment of the present invention. Steps of the flow charts shown in FIGS. 4 to 6 are performed independently of and in parallel to each other.

FIG. 4 is a flow chart showing the procedure for processing relating to charging and discharging control performed by the feed port cover opening operation detector 12. Each step of the flow chart shown in FIG. 4 is performed by the feed port cover opening operation detector 12. The flow chart shown in FIG. 4 is started when the power supply of the charging and discharging control apparatus 1 is turned on, and processing transitions to step c1.

In step c1, the feed port cover opening operation detector 12 judges whether or not the opening instruction signal has been provided from the feed port cover opening and closing controller 27 in step b2 of FIG. 3. In step c1, processing transitions to step c3 when it is judged that the opening instruction signal has been provided, and provision of the opening instruction signal is waited when it is judged that the opening instruction signal has not been provided.

In step c2, the feed port cover opening operation detector 12 judges whether or not a time predetermined as a time to report the state of the feed port cover 30 (hereinafter, also referred to as a "cover state reporting time") has elapsed. In step c2, processing transitions to step c3 when it is judged that the cover state reporting time has elapsed, and processing returns to step c1 when it is judged that the cover state reporting time has not elapsed.

In step c3, the feed port cover opening operation detector 12 provides the feed port cover state signal, which indicates the state of the feed port cover 30, to the charging and discharging start predictor 15. The feed port cover opening operation detector 12 provides, to the charging and discharging start predictor 15, the feed port cover state signal most recently acquired at the time of performing processing in step c1 or step c2.

The feed port cover opening operation detector 12 provides, as the feed port cover state signal, a signal indicating that the feed port cover 30 is opened (hereinafter, also referred to as an "opened state signal") to the charging and discharging start predictor 15 after the opening instruction signal is provided until a signal indicating that the feed port cover 30 is closed is provided from the feed port cover opening and closing controller 27.

When the signal indicating that the feed port cover 30 is closed is provided from the feed port cover opening and closing controller 27, the feed port cover opening operation detector 12 provides, as the feed port cover state signal, a signal indicating that the feed port cover 30 is closed (hereinafter, also referred to as a "closed state signal") to the charging and discharging start predictor 15. Processing returns to step c1 when processing in step c3 ends.

FIG. 5 is a flow chart showing the procedure for processing relating to charging and discharging control performed by the traveling/parked state detector 13. Each step of the flow chart shown in FIG. 5 is performed by the traveling/parked state detector 13. The flow chart shown in FIG. 5 is started when the power supply of the charging and discharging control apparatus 1 is turned on, and processing transitions to step d1.

In step d1, the traveling/parked state detector 13 judges whether the traveling state of the electric motor vehicle 20 has changed or not. In step d1, processing transitions to step d3 when it is judged that the traveling state of the electric motor vehicle 20 has changed, and processing transitions to step d2 when it is judged that the traveling state of the electric motor vehicle 20 has not changed.

In step d2, the traveling/parked state detector 13 judges whether or not a time predetermined as a time to report the traveling state of the electric motor vehicle 20 (hereinafter, also referred to as a "traveling state reporting time") has elapsed. In step d2, processing transitions to step d3 when it is judged that the traveling state reporting time has elapsed, and processing returns to step d1 when it is judged that the traveling state reporting time has not elapsed.

In step d3, the traveling/parked state detector 13 provides the vehicle traveling state signal, which indicates whether the electric motor vehicle 20 is traveling or not, to the charging and discharging start predictor 15. The traveling/parked state detector 13 provides, to the charging and discharging start predictor 15, the vehicle traveling state signal indicating the state of the electric motor vehicle 20 most recently detected at the time of performing processing in step d1.

The traveling/parked state detector 13 provides, as the vehicle traveling state signal, a signal indicating that the electric motor vehicle 20 is traveling (hereinafter, also referred to as a "traveling signal") to the charging and discharging start predictor 15 when the electric motor vehicle 20 is traveling. The traveling/parked state detector 13 provides, as the vehicle traveling state signal, a signal indicating that the electric motor vehicle 20 is parked (hereinafter, also referred to as a "parked signal") to the charging and discharging start predictor 15 when the electric motor vehicle 20 is not traveling, i.e., when the electric motor vehicle 20 is parked. Processing returns to step d1 when processing in step d3 ends.

FIG. 6 is a flow chart showing the procedure for processing relating to charging and discharging control performed by the battery charge amount acquirer 14. Each step of the flow chart shown in FIG. 6 is performed by the battery charge amount acquirer 14. The flow chart shown in FIG. 6 is started when the power supply of the charging and discharging control apparatus 1 is turned on, and processing transitions to step e1.

In step e1, the battery charge amount acquirer 14 judges whether the storage amount of the on-vehicle battery 22, i.e., the charge amount of the on-vehicle battery 22, has changed or not based on the charge amount information acquired from the BMU 23. In step e1, processing transitions to step e3 when it is judged that the storage amount of the on-vehicle battery 22 has changed, and processing transitions to step e2 when it is judged that the storage amount of the on-vehicle battery 22 has not changed.

In step e2, the battery charge amount acquirer 14 judges whether or not a time predetermined as a time to report the storage amount of the on-vehicle battery 22 (hereinafter, also referred to as a "storage amount reporting time") has elapsed. In step e2, processing transitions to step e3 when it is judged that the storage amount reporting time has elapsed, and processing returns to step e1 when it is judged that the storage amount reporting time has not elapsed.

In step e3, the battery charge amount acquirer 14 provides the battery storage amount signal, which indicates the storage amount of the on-vehicle battery 22, to the charging and discharging start predictor 15. The battery charge amount acquirer 41 provides, to the charging and discharging start predictor 15, the battery storage amount signal indicating the storage amount of the on-vehicle battery 22 most recently acquired at the time of performing processing in step e1. Processing returns to step e1 when processing in step e3 ends.

FIG. 7 is a flow chart showing the procedure for processing performed by the charging and discharging start predictor 15 relating to charging and discharging control performed by the charging and discharging control apparatus 1 in the first embodiment of the present invention. Each step of the flow chart shown in FIG. 7 is performed by the charging and discharging start predictor 15. The flow chart shown in FIG. 7 is started when the power supply of the charging and discharging control apparatus 1 is turned on, and processing transitions to step f1.

In step f1, the charging and discharging start predictor 15 predicts whether the charging and discharging operation is started or not from the feed port cover state signal provided in step c3 of FIG. 4 from the feed port cover opening operation detector 12, and judges whether or not the charging and discharging operation is predicted to be started. This means that the charging and discharging start predictor 15 predicts whether the charging and discharging operation is started or not by using the state of the feed port cover 30 indicated by the feed port cover state signal as a judgment criterion.

The charging and discharging start predictor 15 judges that the charging and discharging operation is predicted to be started, for example, when the feed port cover state signal provided from the feed port cover opening operation detector 12 is switched from the closed state signal to the opened state signal. The charging and discharging start predictor 15 judges that the charging and discharging operation is predicted to be started, for example, when the opened state signal is provided before a predetermined time (hereinafter, also referred to as an "activated state maintenance time") has elapsed since switching of the feed port cover state signal from the closed state signal to the opened state signal.

The charging and discharging start predictor 15 judges that the charging and discharging operation is not predicted to be started, for example, when the closed state signal is provided as the feed port cover state signal from the feed port cover opening operation detector 12. The charging and discharging start predictor 15 judges that the charging and discharging operation is not predicted to be started, for example, when the activated state maintenance time has elapsed since switching of the feed port cover state signal from the closed state signal to the opened state signal.

In step f1, processing transitions to step f2 when it is judged from the feed port cover state signal that the charging and discharging operation is predicted to be started, and processing transitions to step f5 when it is judged from the feed port cover state signal that the charging and discharging operation is not predicted to be started.

In step f2, the charging and discharging start predictor 15 predicts whether the charging and discharging operation is started or not from the vehicle traveling state signal provided in step d3 of FIG. 5 from the traveling/parked state detector 13, and judges whether or not the charging and discharging operation is predicted to be started. This means that the charging and discharging start predictor 15 predicts whether the charging and discharging operation is started or not by using the state of the electric motor vehicle 20 indicated by the vehicle traveling state signal as a judgment criterion.

The charging and discharging start predictor 15 judges that the charging and discharging operation is predicted to be started, for example, when the vehicle traveling state signal provided from the traveling/parked state detector 13 is switched from the traveling signal to the parked signal. The charging and discharging start predictor 15 judges that the charging and discharging operation is predicted to be started, for example, when the parked signal is provided before the activated state maintenance time has elapsed since switching of the vehicle traveling state signal from the traveling signal to the parked signal.

The charging and discharging start predictor 15 judges that the charging and discharging operation is not predicted to be started, for example, when the traveling signal is provided as the vehicle traveling state signal from the traveling/parked state detector 13. The charging and discharging start predictor 15 judges that the charging and discharging operation is not predicted to be started, for example, when the activated state maintenance time has elapsed since switching of the vehicle traveling state signal from the traveling signal to the parked signal.

In step f2, processing transitions to step f3 when it is judged from the vehicle traveling state signal that the charging and discharging operation is predicted to be started, and processing transitions to step f5 when it is judged from the vehicle traveling state signal that the charging and discharging operation is not predicted to be started. The activated state maintenance time in step f2 may be set to have the same value as or a different value from the activated state maintenance time in step f1.

In step f3, the charging and discharging start predictor 15 predicts whether the charging and discharging operation is started or not from the battery storage amount signal provided in step e3 of FIG. 6 from the battery charge amount acquirer 14, and judges whether or not the charging and discharging operation is predicted to be started. This means that the charging and discharging start predictor 15 predicts whether the charging and discharging operation is started or not by using information on the storage amount of the on-vehicle battery 22, in other words, the charge amount of the on-vehicle battery 22, indicated by the battery storage amount signal as a judgment criterion.

For example, the charging and discharging start predictor 15 judges whether or not the storage amount of the on-vehicle battery 22 indicated by the battery storage amount signal provided from the battery charge amount acquirer 14 is smaller than the storage amount in a full charge state (hereinafter, also referred to as a "full charge amount"), and, based on the result of judgment, judges whether or not the charging and discharging operation is predicted to be started.

The charging and discharging start predictor 15 judges that the charging and discharging operation is predicted to be started, for example, when the storage amount of the on-vehicle battery 22 indicated by the battery storage amount signal is changed from the storage amount equal to or greater than the full charge amount to the storage amount smaller than the full charge amount. The charging and discharging start predictor 15 judges that the charging and discharging operation is predicted to be started, for example, when the battery storage amount signal indicating the storage amount smaller than the full charge amount is provided before the activated state maintenance time has elapsed since the change of the storage amount of the on-vehicle battery 22 indicated by the battery storage amount signal from the storage amount equal to or greater than the full charge amount to the storage amount smaller than the full charge amount.

The charging and discharging start predictor 15 judges that the charging and discharging operation is not predicted to be started, for example, when the storage amount of the on-vehicle battery 22 indicated by the battery storage amount signal is not smaller than the full charge amount, in other words, the storage amount is equal to or greater than the full charge amount. The charging and discharging start predictor 15 judges that the charging and discharging operation is not predicted to be started, for example, when the activated state maintenance time has elapsed since judgment that the storage amount of the on-vehicle battery 22 indicated by the battery storage amount signal is changed from the storage amount equal to or greater than the full charge amount to the storage amount smaller than the full charge amount.

In step f3, processing transitions to step f4 when it is judged from the battery storage amount signal that the charging and discharging operation is predicted to be started, and processing transitions to step f5 when it is judged from the battery storage amount signal that the charging and discharging operation is not predicted to be started. The activated state maintenance time in step f3 may be set to have the same value as or a different value from the activated state maintenance time in step f1 and the activated state maintenance time in step f2.

In the above-mentioned processing in step f1 to step f3, the charging and discharging start predictor 15 may judge whether or not the charging and discharging operation is predicted to be started in consideration of time, for example. Specifically, the charging and discharging start predictor 15 may predict whether the charging and discharging operation is started or not in accordance with the current time. For example, when the current time is in the morning, the charging and discharging start predictor 15 may judge that the user stops the electric motor vehicle 20 only to return to get something that the user has left behind, and may predict that the charging and discharging operation is not started even when the electric motor vehicle 20 is stopped. As described above, the charging and discharging start predictor 15 makes comprehensive judgement on the conditions in steps f1 to 13 and various other conditions such as time, and determines the prediction result on whether the charging and discharging operation is started or not.

In step f4, the charging and discharging start predictor 15 instructs the charging and discharging control power supply manager 16 to maintain the charging and discharging controller 11 in the activated state or to cause the charging and discharging controller 11 to transition from the standby state to the activated state. The charging and discharging control power supply manager 16 maintains the charging and discharging controller 11 in the activated state when the charging and discharging controller 11 is already in the activated state, and causes the charging and discharging controller 11 to transition to the activated state when the charging and discharging controller 11 is in the standby state. Processing returns to step f1 when processing in step f4 ends.

In step f5, the charging and discharging start predictor 15 instructs the charging and discharging control power supply manager 16 to maintain the charging and discharging controller 11 in the standby state or to cause the charging and discharging controller 11 to transition from the activated state to the standby state. The charging and discharging control power supply manager 16 maintains the charging and discharging controller 11 in the standby state when the charging and discharging controller 11 is in the standby state, and causes the charging and discharging controller 11 to transition from the activated state to the standby state when the charging and discharging controller 11 is in the activated state. Processing returns to step f1 when processing in step f5 ends.

In the present embodiment, the charging and discharging start predictor 15 predicts whether the charging and discharging operation on the on-vehicle battery 22 is started or not as described above. The charging and discharging control power supply manager 16 manages the operating state of the charging and discharging controller 11 in accordance with the result of prediction.

Such management allows the charging and discharging controller 11 to be in the activated state before the user starts to perform the charging and discharging operation. Specifically, the charging and discharging controller 11 is caused to be in the activated state, triggered by the user's instruction to open the feed port cover in step a2 of FIG. 2.

As a result, the charging and discharging controller 11 is caused to be in the activated state before the user starts to perform the charging and discharging operation on the electric motor vehicle 20, and thus the charging and discharging controller 11 can start the charging and discharging processing immediately after the user starts to perform the charging and discharging operation. This reduces users' latency dramatically, and reduces unintentional failure of charging and discharging, leading to improvement in users' convenience.

In the present embodiment, processing returns to step f1 after processing in step f4 or step f5 of FIG. 7 ends, and thus the charging and discharging start predictor 15 makes judgment in step f1 to step f3 regularly. The charging and discharging start predictor 15 predicts whether the charging and discharging operation is started or not regularly as described above to switch the state of the charging and discharging controller 11 in accordance with the status of performing the charging and discharging operation.

For example, the charging and discharging controller can be maintained in the standby state while the charging and discharging operation is not predicted to be started. In a case where the charging and discharging operation is not performed when a certain period has elapsed since prediction of the start of the charging and discharging operation, the charging and discharging controller 11 and the on-vehicle charger 21 can be caused to transition from the activated state to the standby state.

This allows the charging and discharging controller 11 and the on-vehicle charger 21 to effectively be in the standby state in which power consumption is low, leading to improvement in electric cost of the electric motor vehicle 20. This also prevents a so-called flat battery caused by consuming power stored in the on-vehicle battery 22 when the electric motor vehicle 20 is not used, leading to reduction in trouble.

In the present embodiment, the charging and discharging start predictor 15 predicts that the charging and discharging operation is started when the opening operation detection signal is provided from the feed port cover opening operation detector 12. When the charging and discharging start predictor 15 predicts that the charging and discharging operation is started, the charging and discharging control power supply manager 16 maintains the charging and discharging controller 11 in the activated state or causes the charging and discharging controller 11 to transition from the standby state to the activated state.

With such configuration, the charging and discharging control apparatus 1 that can predict the start of the charging and discharging operation, and can cause the charging and discharging controller 11 to be in the activated state based on the result of prediction can be achieved with simple configuration.

In the present embodiment, when the charging and discharging start predictor 15 predicts that the charging and discharging operation is not started, the charging and discharging start predictor 15 instructs the charging and discharging control power supply manager 16 to maintain the charging and discharging controller 11 in the standby state or to cause the charging and discharging controller 11 to transition from the activated state to the standby state in step f5. This prevents the charging and discharging controller 11 from unnecessarily transitioning from the standby state to the activated state, leading to further reduction of power consumption.

In the present embodiment, the charging and discharging start predictor 15 predicts whether the charging and discharging operation is started or not in accordance with the battery storage amount signal provided from the battery charge amount acquirer 14 in step f3. This improves accuracy of prediction on whether the charging and discharging operation is started or not.

In the present embodiment, the charging and discharging start predictor 15 predicts whether the charging and discharging operation is started or not in accordance with the result of detection performed by the traveling/parked state detector 13 in step f2. This improves accuracy of prediction on whether the charging and discharging operation is started or not.

Second Embodiment

Figure 8:
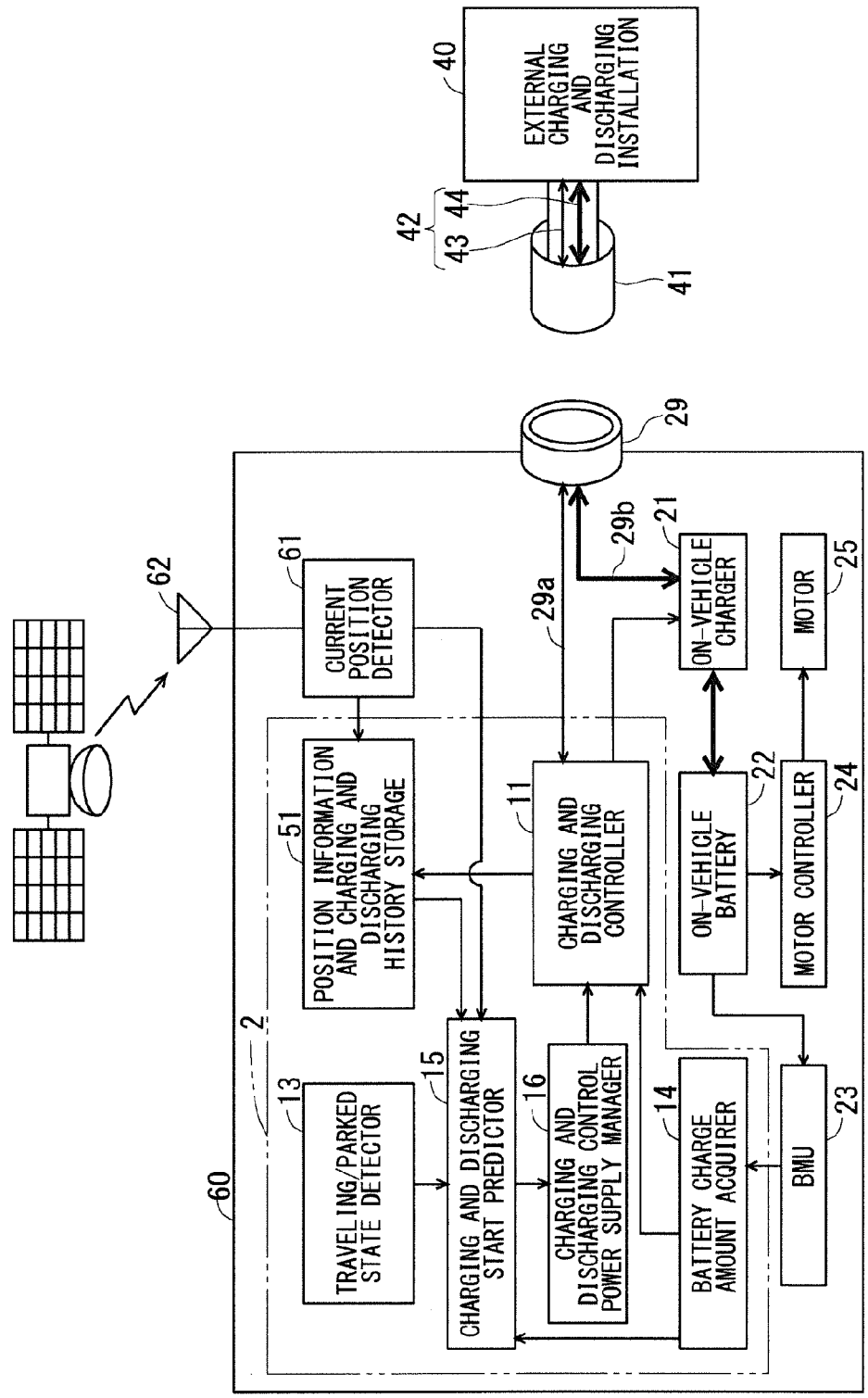
FIG. 8 is a block diagram showing configuration of a charging and discharging system 50 including a charging and discharging control apparatus 2 in the second embodiment of the present invention.

FIG. 8 is a block diagram showing configuration of a charging and discharging system 50 including a charging and discharging control apparatus 2 in the second embodiment of the present invention. The charging and discharging system 50 in the present embodiment has similar configuration to the charging and discharging system 10 in the above-mentioned first embodiment, and thus the same components bear the same reference signs and description thereof is omitted.

The charging and discharging system 50 includes the external charging and discharging installation 40 and an electric motor vehicle 60 that includes the charging and discharging control apparatus 2. The electric motor vehicle 60 includes the charging and discharging control apparatus 2, the on-vehicle charger 21, the on-vehicle battery 22, the BMU 23, the motor controller 24, the motor 25, the feed port 29, a current position detector 61, and an antenna 62. The charging and discharging control apparatus 2 includes the charging and discharging controller 11, the traveling/parked state detector 13, the battery charge amount acquirer 14, the charging and discharging start predictor 15, the charging and discharging control power supply manager 16, and a position information and charging and discharging history storage 51.

The current position detector 61 is implemented by a transceiver, for example. The current position detector 61 includes the antenna 62. The current position detector 61 estimates the current position with use of a global positioning system (GPS) sensor acquiring the current position of the electric motor vehicle 60, a service set identifier (an SSID) of a neighboring wireless local area network (LAN) base station, and the like.

The current position detector 61 generates current position information indicating the estimated current position, and provides the generated current position information to the charging and discharging start predictor 15 and the position information and charging and discharging history storage 51. Each time a time predetermined as a time to report the current position information (hereinafter, also referred to as a "current position reporting time") has elapsed, the current position detector 61 provides, to the charging and discharging start predictor 15, the current position information most recently acquired at the time.

The position information and charging and discharging history storage 51 stores charging and discharging operation information. The charging and discharging operation information at least includes charging and discharging performing position information and charging and discharging history information. The charging and discharging performing position information indicates a charging and discharging performing position that is the current position of the electric motor vehicle 60 detected by the current position detector 61 when the on-vehicle battery 22 is charged or discharged by the charging and discharging controller 11. The charging and discharging history information indicates whether or not the charging and discharging operation was performed in the past.

The position information and charging and discharging history storage 51 is implemented by a hard disk drive (HDD) apparatus or a non-volatile storage medium, such as semiconductor memory, for example. The position information and charging and discharging history storage 51 stores the above-mentioned charging and discharging performing position information and charging and discharging history information in association with each other. Specifically, the position information and charging and discharging history storage 51 stores information of a table as shown in Table 1, for example. Use of Table 1 allows for search for a plurality of past charging and discharging histories by using the charging and discharging performing position information as an index.

TABLE 1

| CHARGING AND DISCHARGING PERFORMING POSITION | CHARGING AND DISCHARGING CONTROL ACTIVATION CONDITION | CHARGING AND DISCHARGING HISTORY 1 | CHARGING AND DISCHARGING HISTORY 2 |
|---|---|---|---|
| POSITION INFORMATION 345 D TOWN C CITY | START PERFORMANCE >50% NO ADDITIONAL CONDITION | CHARGING Dec. 22, 2011 | CHARGING Dec. 3, 2011 |
| POSITION INFORMATION 123-1 B TOWN A CITY | START PERFORMANCE >50% + ONLY AT NIGHT | CHARGING Jan. 5, 2012 | CHARGING Jan. 3, 2012 |
| POSITION INFORMATION 836-67D H WARD E CITY | START PERFORMANCE >50% + BATTERY >70% | NO CHARGING AND DISCHARGING Dec. 24, 2012 | NO CHARGING AND DISCHARGING Dec. 17, 2011 |
| . . . | . . . | . . . | . . . |

TABLE 1-continued

| CHARGING AND DISCHARGING PERFORMING POSITION | CHARGING AND DISCHARGING HISTORY 3 | ... | CHARGING AND DISCHARGING HISTORY N | CHARGING AND DISCHARGING PERFORMANCE |
|---|---|---|---|---|
| POSITION INFORMATION 345 D TOWN C CITY | CHARGING Oct. 22, 2011 | ... | CHARGING Oct. 10, 2011 | 95% |
| POSITION INFORMATION 123-1 B TOWN A CITY | NO CHARGING AND DISCHARGING Jan. 1, 2012 | ... | CHARGING Dec. 28, 2011 | 30% |
| POSITION INFORMATION 836-67D H WARD E CITY | DISCHARGING Dec. 3, 2011 | ... | DISCHARGING Nov. 20, 2011 | 70% |
| ... | ... | ... | ... | ... |

The charging and discharging operation information may include, as additional information, a charging and discharging control activation condition corresponding to the charging and discharging performing position information, and charging and discharging performance indicating frequency at which the charging and discharging operation is performed.

The charging and discharging start predictor 15 searches the table stored in the position information and charging and discharging history storage 51 based on the current position information received from the current position detector 61 to acquire a history indicating that the charging and discharging operation was started in the past.

Although the charging and discharging start predictor 15 predicts whether the charging and discharging operation is started or not on the condition that the operation to open the feed port cover 30 is detected in the above-mentioned first embodiment, the charging and discharging start predictor 15 predicts whether the charging and discharging operation is started or not through use of the past charging and discharging operation start history corresponding to the current position of the electric motor vehicle 60 in the present embodiment.

In the present embodiment, the above-mentioned steps performed by the traveling/parked state detector 13 shown in FIG. 5 and steps performed by the battery charge amount acquirer 14 shown in FIG. 6 are performed independently of and in parallel to each other as in the above-mentioned first embodiment.

In the present embodiment, the on-vehicle charger 21 provides information indicating that charging and discharging have been performed (hereinafter, also referred to as "charging and discharging performing information") to the charging and discharging controller 11 when charging and discharging are performed. The charging and discharging controller 11 updates the charging and discharging operation information stored in the position information and charging and discharging history storage 51 when the charging and discharging performing information is provided.

Figure 9:
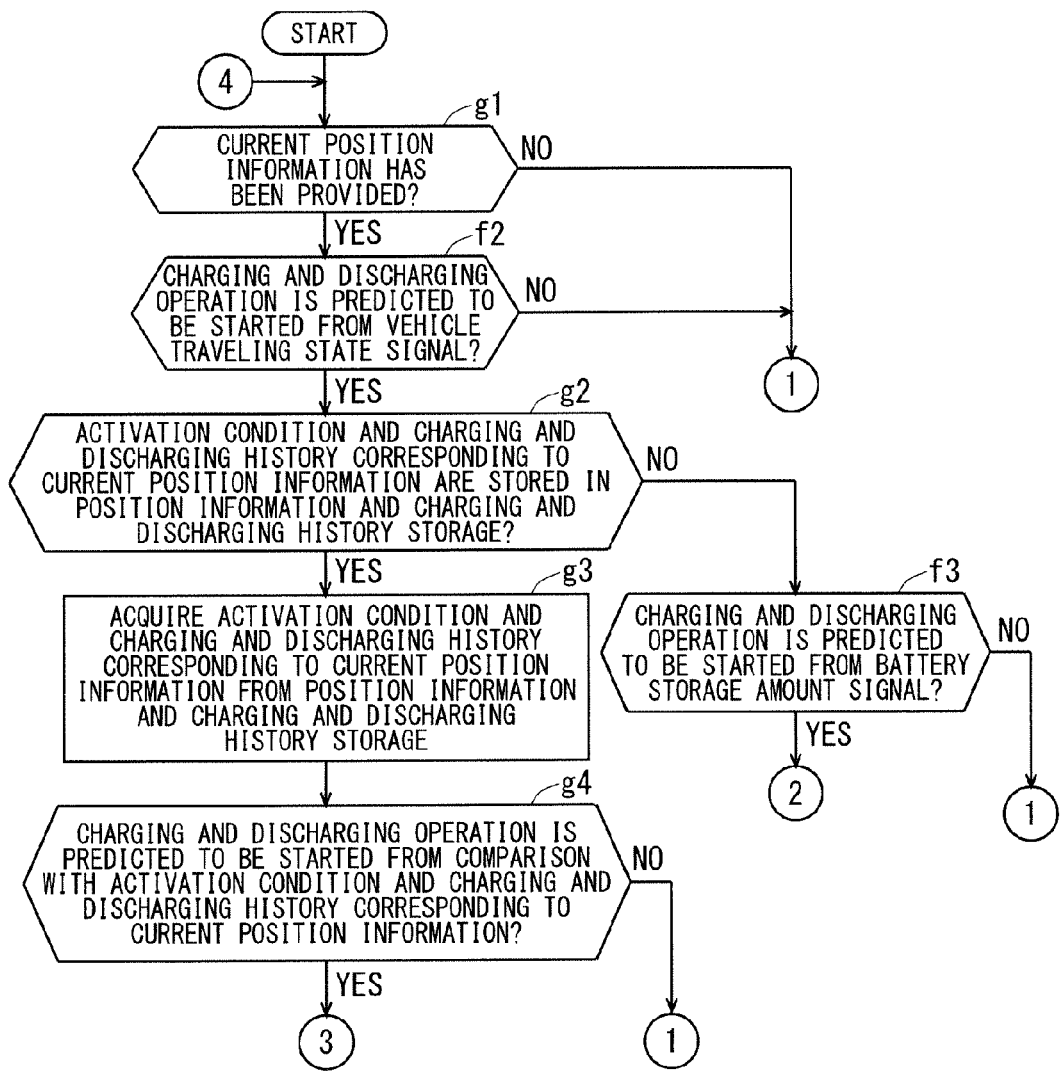
FIG. 9 is a flow chart showing the procedure for processing relating to charging and discharging control processing performed by the charging and discharging control apparatus 2 in the second embodiment of the present invention.
Figure 10:
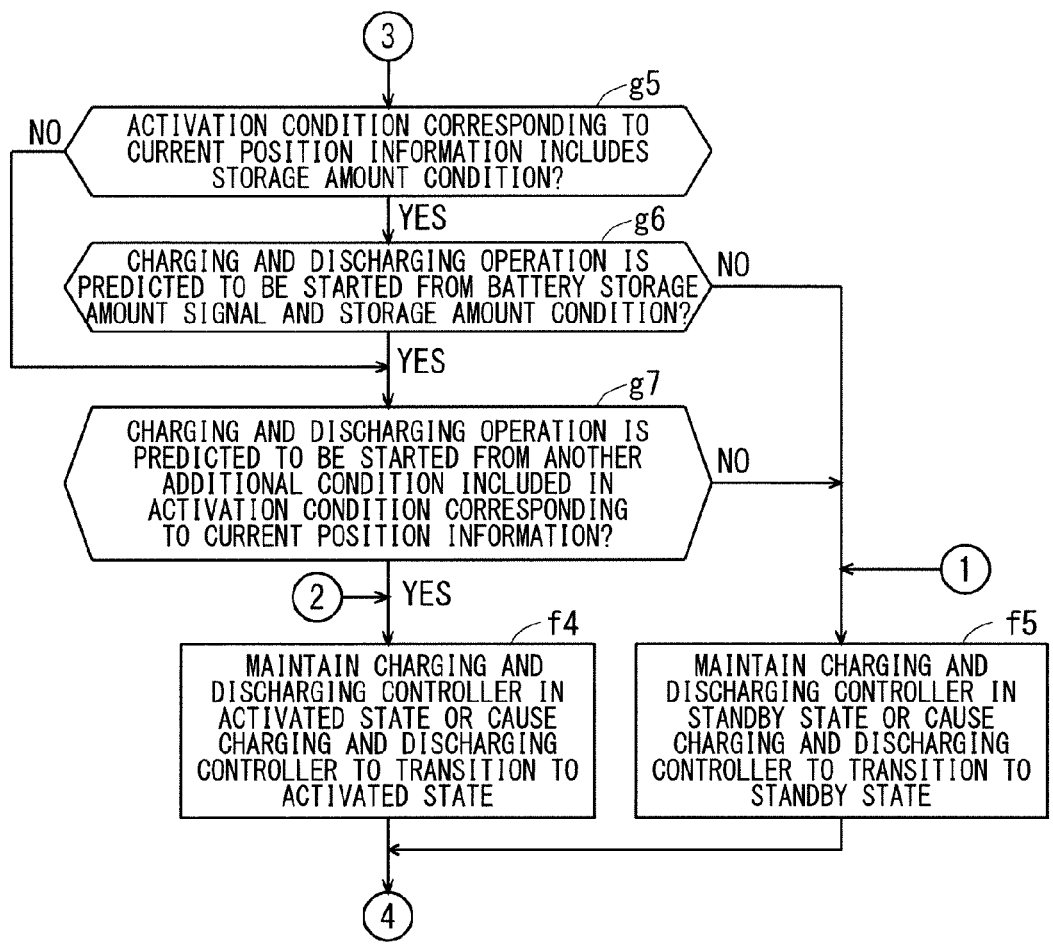
FIG. 10 is a flow chart showing the procedure for processing relating to charging and discharging control processing performed by the charging and discharging control apparatus 2 in the second embodiment of the present invention.

FIGS. 9 and 10 are flow charts showing the procedure for processing relating to charging and discharging control processing performed by the charging and discharging control apparatus 2 in the second embodiment of the present invention. Processing of the flow charts shown in FIGS. 9 and 10 is similar to the above-mentioned processing of the flow chart shown in FIG. 7, and thus the same steps bear the same reference signs and description thereof is omitted. Each step of the flow charts shown in FIGS. 9 and 10 is performed by the charging and discharging start predictor 15. The flow charts shown in FIGS. 9 and 10 are started when the power supply of the charging and discharging control apparatus 2 is turned on, and processing transitions to step g1 of FIG. 9.

In step g1, the charging and discharging start predictor 15 judges whether or not the current position information has been provided from the current position detector 61. In step g1, processing transitions to step f2 when it is judged that the current position information has been provided, and processing transitions to step f5 of FIG. 10 when it is judged that the current position information has not been provided. Since the current position information is provided from the current position detector 61 each time the current position reporting time has elapsed as described above, it is judged that the current position information has been provided each time the current position reporting time has elapsed, and processing transitions to step f2.

In step f2, the charging and discharging start predictor 15 predicts whether the charging and discharging operation is started or not from the vehicle traveling state signal provided in step d3 of FIG. 5 from the traveling/parked state detector 13, and judges whether or not the charging and discharging operation is predicted to be started as in the first embodiment. In step f2, processing transitions to step g2 when it is judged that the charging and discharging operation is predicted to be started, and processing transitions to step f5 of FIG. 10 when it is judged that the charging and discharging operation is not predicted to be started.

In step g2, the charging and discharging start predictor 15 searches the position information and charging and discharging history storage 51, and judges whether or not the activation condition and the charging and discharging history that correspond to the current position information are stored in the position information and charging and discharging history storage 51. In step g2, processing transitions to step g3 when it is judged that the activation condition and the charging and discharging history that correspond to the current position information are stored in the position information and charging and discharging history storage 51, and processing transitions to step f3 when it is judged that the activation condition and the charging and discharging history that correspond to the current position information are not stored in the position information and charging and discharging history storage 51.

In step f3, the charging and discharging start predictor 15 predicts whether the charging and discharging operation is started or not from the battery storage amount signal provided in step e3 of FIG. 6 from the battery charge amount acquirer 14, and judges whether or not the charging and discharging operation is predicted to be started as in the first embodiment. In step f3, processing transitions to step f4 of FIG. 10 when it is judged that the charging and discharging operation is predicted to be started, and processing transitions to step f5 of FIG. 10 when it is judged that the charging and discharging operation is not predicted to be started.

In step g3, the charging and discharging start predictor 15 acquires the activation condition and the past charging and discharging history that correspond to the current position information from the position information and charging and discharging history storage 51. Processing transitions to step g4 when processing in step g3 ends.

In step g4, the charging and discharging start predictor 15 judges whether or not the charging and discharging operation is predicted to be started from comparison with the activation condition and the past charging and discharging history that correspond to the current position information. In step g4, processing transitions to step g5 of FIG. 10 when it is judged that the charging and discharging operation is predicted to be started, and processing transitions to step f5 of FIG. 10 when it is judged that the charging and discharging operation is not predicted to be started, i.e., when it is predicted that the charging and discharging operation is not started.

In step g5 of FIG. 10, the charging and discharging start predictor 15 judges whether or not the activation condition corresponding to the current position information includes, as an additional condition, a condition relating to the storage amount of the on-vehicle battery 22 (hereinafter, also referred to as a "storage amount condition"). In step g5, processing transitions to step g6 when it is judged that the activation condition includes the storage amount condition, and processing transitions to step g7 when it is judged that the activation condition does not include the storage amount condition.

In step g6, the charging and discharging start predictor 15 judges whether or not the charging and discharging operation is predicted to be started from the battery storage amount signal and the storage amount condition. In step g6, processing transitions to step g7 when it is judged that the charging and discharging operation is predicted to be started, and processing transitions to step f5 when it is judged that the charging and discharging operation is not predicted to be started, i.e., when it is predicted that the charging and discharging operation is not started.

In step g7, the charging and discharging start predictor 15 judges whether or not the charging and discharging operation is predicted to be started from another additional condition included in the activation condition corresponding to the current position information. In step g7, processing transitions to step f4 when it is judged that the charging and discharging operation is predicted to be started, and processing transitions to step f5 when it is judged that the charging and discharging operation is not predicted to be started, i.e., when it is predicted that the charging and discharging operation is not started.

In step f4, the charging and discharging start predictor 15 instructs the charging and discharging control power supply manager 16 to maintain the charging and discharging controller 11 in the activated state or to cause the charging and discharging controller 11 to transition from the standby state to the activated state as in the first embodiment. Processing returns to step g1 when processing in step f4 ends.

In step f5, the charging and discharging start predictor 15 instructs the charging and discharging control power supply manager 16 to maintain the charging and discharging controller 11 in the standby state or to cause the charging and discharging controller 11 to transition from the activated state to the standby state as in the first embodiment. Processing returns to step g1 when processing in step f5 ends.

Although operation of the charging and discharging control apparatus 2 and the electric motor vehicle 60 to start the charging and discharging control is shown in FIGS. 9 and 10, the operation of the charging and discharging control apparatus 2 and the electric motor vehicle 60 is not limited to this operation. Processing shown in FIGS. 9 and 10 may be performed after the charging and discharging start predictor 15 predicts that the charging and discharging operation is started, and the charging and discharging control power supply manager 16 causes the charging and discharging controller 11 to transition from the standby state to the activated state, or after a main power supply of the electric motor vehicle 60 is turned on, for example. In processing shown in FIGS. 9 and 10, the charging and discharging control power supply manager 16 causes the charging and discharging controller 11 to be in the standby state as shown in step f5 of FIG. 10 when the charging and discharging start predictor 15 predicts that the charging and discharging operation is not started.

Figure 11:
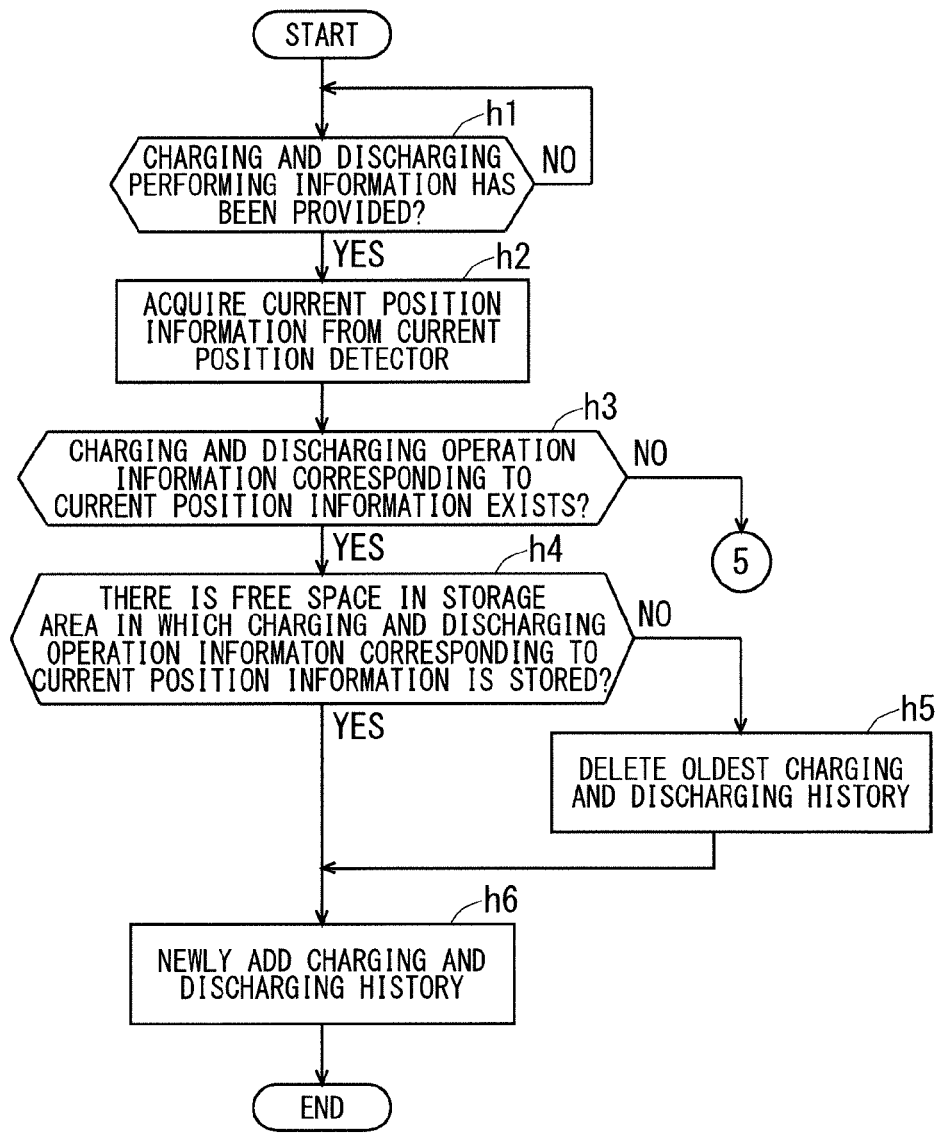
FIG. 11 is a flow chart showing an operation to update charging and discharging operation information stored in a position information and charging and discharging history storage 51 in the second embodiment of the present invention.

FIGS. 11 and 12 are flow charts showing an operation to update the charging and discharging operation information stored in the position information and charging and discharging history storage 51 in the second embodiment of the present invention. Each step of the flow charts shown in FIGS. 11 and 12 is performed by the charging and discharging controller 11. The flow charts shown in FIGS. 11 and 12 are started when the power supply of the charging and discharging control apparatus 2 is turned on, and processing transitions to step h1 of FIG. 11.

In step h1, the charging and discharging controller 11 judges whether the charging and discharging performing information has been provided or not. In step h1, processing transitions to step h2 when it is judged that the charging and discharging performing information has been provided, and provision of the charging and discharging performing information is waited when it is judged that the charging and discharging performing information has not been provided.

In step h2, the charging and discharging controller 11 acquires the current position information from the current position detector 61. Processing transitions to step h3 when the current position information is acquired.

In step h3, the charging and discharging controller 11 judges whether or not the charging and discharging operation information corresponding to the current position information exists in the position information and charging and discharging history storage 51. In step h3, processing transitions to step h4 when it is judged that the charging and discharging operation information corresponding to the current position information exists, and processing transitions to step h7 of FIG. 12 when it is judged that the charging and discharging operation information corresponding to the current position information does not exist.

In step h4, the charging and discharging controller 11 judges whether or not there is a free space in a storage area, of the position information and charging and discharging history storage 51, in which the charging and discharging operation information corresponding to the current position information is stored. In step h4, processing transitions to step h6 when it is judged that there is the free space, and processing transitions to step h5 when it is judged that there is not the free space.

In step h5, the charging and discharging controller 11 deletes the oldest charging and discharging history information in the charging and discharging operation information corresponding to the current position information stored in the position information and charging and discharging history storage 51. Processing transitions to step h6 when the oldest charging and discharging history information is deleted.

In step h6, the charging and discharging controller 11 newly adds the charging and discharging history information to the charging and discharging operation information corresponding to the current position information stored in the position information and charging and discharging history storage 51. For example, "CHARGING AND DISCHARGING" is recorded as the charging and discharging history information when charging and discharging are performed. When there is additional information, the charging and discharging controller 11 adds the additional information to the charging and discharging operation information corresponding to the current position information stored in the position information and charging and discharging history storage 51, or updates the additional information of the charging and discharging operation information corresponding to the current position information stored in the position information and charging and discharging history storage 51. The whole processing procedure ends when the charging and discharging history information is added.

In step h7 of FIG. 12, the charging and discharging controller 11 judges whether or not there is a free space for newly adding the charging and discharging operation information in the position information and charging and discharging history storage 51. In step h7, processing transitions to step h10 when it is judged that there is the free space for newly adding the charging and discharging operation information, and processing transitions to step h8 when it is judged that there is not the free space for newly adding the charging and discharging operation information.

In step h8, the charging and discharging controller 11 converts degrees of importance of all pieces of the charging and discharging operation information stored in the position information and charging and discharging history storage 51 into numerical values. Processing transitions to step h9 when the degrees of importance of all pieces of the charging and discharging operation information are converted into the numerical values.

In step h9, the charging and discharging controller 11 deletes the charging and discharging operation information whose degree of importance is the lowest from the position information and charging and discharging history storage 51. Processing transitions to h10 when the charging and discharging operation information whose degree of importance is the lowest is deleted.

In step h10, the charging and discharging controller 11 adds the charging and discharging operation information corresponding to the current position information to the position information and charging and discharging history storage 51. The whole processing procedure ends when the charging and discharging operation information is added.

In converting the degrees of importance of the pieces of the charging and discharging operation information into the numerical values in step h8 of FIG. 12, frequency at which the charging and discharging operation was started in the past, e.g., charging and discharging performance in Table 1, can be used as an index. A least recently used (LRU) algorithm may simply be used in which conversion into numerical values is performed such that information in which update time of history information, e.g., time shown in the first column of the charging and discharging history in Table 1, is new is set as important information, and information in which the update time is the oldest is deleted first.

In updating based on LRU, however, position information indicating a position which an electric motor vehicle for commercial use visits frequently for delivery and other purposes, for example, but at which charging and discharging are not performed is considered to occupy a large space of the position information and charging and discharging history storage 51. By using the frequency at which the charging and discharging operation was started as a criterion, more information corresponding to the position information indicating a position at which the charging and discharging operation is likely to be started can be stored, leading to improvement in accuracy of prediction performed by the charging and discharging start predictor 15. Even if information corresponding to the position information indicating a position at which the charging and discharging operation is less likely to be started is discarded, and, as a result, prediction performed by the charging and discharging start predictor 15 regarding the position fails, such failure has little effect on users' convenience as it does not occur frequently.

In the present embodiment, the charging and discharging start predictor 15 predicts whether the charging and discharging operation on the on-vehicle battery 22 is started or not as described above as in the first embodiment. In accordance with the result of prediction, the charging and discharging control power supply manager 16 manages transition of the charging and discharging controller 11 from the activated state to the standby state and from the standby state to the activated state. As a result, an effect similar to the effect obtained in the first embodiment can be obtained.

In the present embodiment, the charging and discharging start predictor 15 compares the current position information indicating the current position of the electric motor vehicle 60 detected by the current position detector 61 and the charging and discharging performing position information included in the charging and discharging operation information stored in the position information and charging and discharging history storage 51. The charging and discharging start predictor 15 predicts whether the charging and discharging operation is started or not based on the result of comparison.

For example, the charging and discharging start predictor 15 predicts, from the result of comparison, that the charging and discharging operation is started when the charging and discharging performing position information indicating a position near the position indicated by the charging and discharging performing position information corresponding to the current position information is included in the charging and discharging operation information stored in the position information and charging and discharging history storage 51.

For example, the charging and discharging start predictor 15 predicts that the charging and discharging operation is started when the charging and discharging performing position information corresponding to the current position information is included in the charging and discharging operation information stored in the position information and charging and discharging history storage 51, and the charging and discharging history information indicating that charging and discharging were not performed is not included in the charging and discharging operation information.

When the charging and discharging start predictor 15 predicts that the charging and discharging operation is started, the charging and discharging control power supply manager 16 causes the charging and discharging controller 11 to transition from the standby state to the activated state or maintains the charging and discharging controller 11 in the activated state.

With such configuration, the charging and discharging control apparatus 2 that can predict the start of the charging and discharging operation, and can cause the charging and discharging controller 11 to be in the activated state based on the result of prediction can be achieved with simple configuration.

The charging and discharging performing position information corresponding to the current position information herein may be the charging and discharging performing position information that matches the current position information, and may be the charging and discharging performing position information indicating a position near the current position indicated by the current position information.

In the present embodiment, in step g2 of FIG. 9, judgment is made on whether or not the charging and discharging operation information corresponding to the current position information, specifically the activation condition and the charging and discharging history information that correspond to the current position information, is stored in the position information and charging and discharging history storage 51. When it is judged that it is not stored in step g2, whether the charging and discharging operation is started or not is predicted from the battery storage amount signal in step f3.

Processing is not limited to this processing, and, when it is judged that the charging and discharging operation information corresponding to the current position information is not stored in the position information and charging and discharging history storage 51 in step g2, the charging and discharging start predictor 15 may predict that the charging and discharging operation is started, and processing may transition to step f4 of FIG. 10.

In the present embodiment, the charging and discharging start predictor 15 predicts whether the charging and discharging operation is started or not in accordance with the current time. This improves accuracy of prediction on whether the charging and discharging operation is started or not.

In the present embodiment, the charging and discharging start predictor 15 predicts whether the charging and discharging operation is started or not in accordance with an elapsed time since transition of the charging and discharging controller 11 from the standby state to the activated state caused by the manager 16. This improves accuracy of prediction on whether the charging and discharging operation is started or not.

In the present embodiment, the charging and discharging controller 11 judges whether or not there is the free space for storing the charging and discharging operation information newly provided in the position information and charging and discharging history storage 51 when the charging and discharging operation information is newly provided. When judging that there is not the free space in the position information and charging and discharging history storage 51, the charging and discharging controller 11 converts degrees of importance of stored pieces of the charging and discharging operation information stored in the position information and charging and discharging history storage 51 into numerical values, deletes the charging and discharging operation information whose degree of importance is relatively low based on the degrees of importance having converted into the numerical values from the position information and charging and discharging history storage 51, and stores the charging and discharging operation information newly provided in the position information and charging and discharging history storage 51.

By updating the charging and discharging operation information stored in the charging and discharging history storage 51 as described above, the charging and discharging operation information whose degree of importance is relatively high can be used to predict whether the charging and discharging operation is started or not. This improves accuracy of prediction on whether the charging and discharging operation is started or not.

In the present embodiment, the current position detector 61 is located external to the charging and discharging control apparatus 2. An example of the current position detector 61 is an apparatus installed in the electric motor vehicle 60 other than the charging and discharging control apparatus 2, such as a current position detector included in a car navigation apparatus. The current position detector 61 is not limited to this current position detector, and may be included in the charging and discharging control apparatus 2.

As described above, in the first and second embodiments, the electric motor vehicles 20 and 60 include the charging and discharging control apparatus 1, 2 having the above-mentioned effects and the on-vehicle battery 22, and the charging and discharging control apparatus 1, 2 controls charging and discharging of the on-vehicle battery 22. As a result, the period until the charging and discharging processing on the storage apparatus is started can be reduced while power consumption when the electric motor vehicle is not used is reduced.

In the above-mentioned embodiments, the electric motor vehicles 20 and 60 include the on-vehicle battery 22 as the storage apparatus. The storage apparatus is not limited to the on-vehicle battery 22, and may be any storage apparatus, such as a battery, a capacitor, and a flywheel, that electrically, chemically, or mechanically stores electric energy.

The above-mentioned embodiments of the present invention can freely be combined with each other, and any components in each of the embodiments can appropriately be modified and omitted within the scope of the present invention.

While the present invention has been described in detail, the foregoing description is in all aspects illustrative and not restrictive. It is therefore understood that numerous modifications that have not been described can be devised without departing from the scope of the present invention.

REFERENCE SIGNS LIST 1, 2 charging and discharging control apparatus, 10, 50 charging and discharging system, 11 charging and discharging controller, 12 feed port cover opening operation detector, 13 traveling/parked state detector, 14 battery charge amount acquirer, 15 charging and discharging start predictor, 16 charging and discharging control power supply manager, 20, 60 electric motor vehicle, 21 on-vehicle charger, 22 on-vehicle battery, 23 battery management unit (BMU), 24 motor controller, 25 motor, 26 feed port cover operator, 27 feed port cover opening and closing controller, 28 antenna, 29 feed port, 30 feed port cover, 40 external charging and discharging installation, 41 charging gun, 42 feed cable, 43 communication line, 44 power line, 51 position information and charging and discharging history storage, 61 current position detector, 63 GPS satellite

The invention claimed is:
1. A charging and discharging control apparatus that controls at least one of charging and discharging of a storage apparatus installed in an electric motor vehicle, the charging and discharging control apparatus comprising:

at least one hardware processor configured to implement:
a charging and discharging start predictor that predicts whether a charging and discharging operation will be started or not, the charging and discharging operation including at least one of an operation to charge said storage apparatus and an operation to discharge said storage apparatus;
a charging and discharging controller that performs charging and discharging processing including at least one of charging and discharging of said storage apparatus; and
a manager that manages an operating state of said charging and discharging controller, wherein
the operating state of said charging and discharging controller is capable of transitioning between an activated state in which said charging and discharging processing is possible and a standby state in which power consumption is lower than in said activated state, and
said manager manages the operating state of said charging and discharging controller in accordance with a result of prediction performed by said charging and discharging start predictor.

2. The charging and discharging control apparatus according to claim 1,
wherein the at least one hardware processor is further configured to implement an opening operation detector that detects an opening operation to provide an instruction to open a cover of a feed port for supplying power to said storage apparatus, wherein
said charging and discharging start predictor predicts that said charging and discharging operation will be started when said opening operation detector detects said opening operation, and
said manager causes said charging and discharging controller to transition from said standby state to said activated state when said charging and discharging start predictor predicts that said charging and discharging operation will be started.

3. The charging and discharging control apparatus according to claim 1, wherein
said electric motor vehicle includes a current position detector that detects a current position of said electric motor vehicle,
the charging and discharging control apparatus further comprises a charging and discharging history storage that stores charging and discharging operation information at least including charging and discharging performing position information indicating a charging and discharging performing position, the charging and discharging performing position being the current position of said electric motor vehicle detected by said current position detector when said storage apparatus is charged or discharged by said charging and discharging controller,
said charging and discharging start predictor compares said charging and discharging performing position information and current position information indicating the current position of said electric motor vehicle detected by said current position detector, and, based on a result of comparison, predicts whether said charging and discharging operation will be started or not, and
said manager causes said charging and discharging controller to transition from said standby state to said activated state or maintains said charging and discharging controller in said activated state when said charging and discharging start predictor predicts that said charging and discharging operation will be started.

4. The charging and discharging control apparatus according to claim 1, wherein
said manager causes said charging and discharging controller to transition from said activated state to said standby state or maintains said charging and discharging controller in said standby state when said charging and discharging start predictor predicts that said charging and discharging operation is not started.

5. The charging and discharging control apparatus according to claim 1,
wherein the at least one hardware processor is further configured to implement a storage amount acquirer that acquires a storage amount of said storage apparatus, wherein
said charging and discharging start predictor predicts whether said charging and discharging operation will be started or not at least in accordance with the storage amount of said storage apparatus acquired by said storage amount acquirer.

6. The charging and discharging control apparatus according to claim 1, further comprising
wherein the at least one hardware processor is further configured to implement a traveling/parked state detector that detects whether said electric motor vehicle is traveling or is parked, wherein
said charging and discharging start predictor predicts whether said charging and discharging operation will be started or not at least in accordance with a result of detection performed by said traveling/parked state detector.

7. The charging and discharging control apparatus according to claim 1, wherein
said charging and discharging start predictor predicts whether said charging and discharging operation will be started or not in accordance with current time.

8. The charging and discharging control apparatus according to claim 1, wherein
said charging and discharging start predictor predicts whether said charging and discharging operation will be started or not in accordance with an elapsed time since transition of said charging and discharging controller from said standby state to said activated state caused by said manager.

9. The charging and discharging control apparatus according to claim 3, wherein
said charging and discharging controller
when said charging and discharging operation information is newly provided, judges whether or not there is a free space for storing said charging and discharging operation information newly provided in said charging and discharging history storage, and
when judging that there is not said free space, converts degrees of importance of stored pieces of said charging and discharging operation information stored in said charging and discharging history storage into numerical values, deletes said charging and discharging operation information whose degree of importance is relatively low based on said degrees of importance having converted into the numerical values from said charging and discharging history storage, and stores said charging and discharging operation information newly provided in said charging and discharging history storage.

10. An electric motor vehicle comprising:

a storage apparatus that is chargeable and dischargeable; and a charging and discharging control apparatus that controls at least one of charging and discharging of said storage apparatus installed in said electric motor vehicle, the charging and discharging control apparatus comprising:

at least one hardware processor configured to implement:

a charging and discharging start predictor that predicts whether a charging and discharging operation will be started or not, the charging and discharging operation including at least one of an operation to charge said storage apparatus and an operation to discharge said storage apparatus;

a charging and discharging controller that performs charging and discharging processing including at least one of charging and discharging of said storage apparatus; and a manager that manages an operating state of said charging and discharging controller, wherein the operating state of said charging and discharging controller is capable of transitioning between an activated state in which said charging and discharging processing is possible and a standby state in which power consumption is lower than in said activated state, and said manager manages the operating state of said charging and discharging controller in accordance with a result of prediction performed by said charging and discharging start predictor.

* * * * *